United States Patent
Homan et al.

(10) Patent No.: US 7,325,595 B2
(45) Date of Patent: Feb. 5, 2008

(54) AUTOMOTIVE AIR CONDITIONING SYSTEM

(75) Inventors: Toshinobu Homan, Oobu (JP); Mitsuyo Oomura, Hekinan (JP); Makoto Yoshida, Hiroshima (JP)

(73) Assignee: DENSO Corporation, Kariya (JP)

( * ) Notice: Subject to any disclaimer, the term of this patent is extended or adjusted under 35 U.S.C. 154(b) by 598 days.

(21) Appl. No.: 10/919,010

(22) Filed: Aug. 16, 2004

(65) Prior Publication Data

US 2005/0056413 A1  Mar. 17, 2005

(30) Foreign Application Priority Data

Aug. 19, 2003 (JP) .............................. 2003-295353

(51) Int. Cl.
*B60H 1/00* (2006.01)

(52) U.S. Cl. ..................... 165/204; 165/202; 62/244

(58) Field of Classification Search ................ 165/202, 165/203, 204, 42, 43, 44; 62/239, 244; 237/2 A, 237/2 R See application file for complete search history.

(56) References Cited

U.S. PATENT DOCUMENTS

| 6,135,201 | A | * | 10/2000 | Nonoyama et al. | ......... 165/204 |
| 6,164,367 | A | * | 12/2000 | Kurahashi et al. | ............ 165/42 |
| 6,352,102 | B1 | * | 3/2002 | Takechi et al. | ............... 165/42 |
| 6,360,958 | B1 | * | 3/2002 | Ito et al. | ..................... 237/2 A |
| 7,140,427 | B2 | * | 11/2006 | Honda et al. | ............... 165/202 |

FOREIGN PATENT DOCUMENTS

JP        3323097       6/2002

* cited by examiner

*Primary Examiner*—Ljiljana Ciric
(74) *Attorney, Agent, or Firm*—Harness, Dickey & Pierce, PLC

(57) ABSTRACT

In a hybrid vehicle air conditioning system in which coolant is supplied to a heater core from a vehicle running engine, for heating, a demand of the operation of the vehicle running engine is controlled to obtain respective set coolant temperatures TWS2 for target air-outlet temperature TAO of air sent out into a passenger compartment during a bilevel mode operation and TWS1 for the target air-outlet temperature TAO during a foot mode operation by setting the set coolant temperature TWS2 higher than the set coolant temperature TWS1.

8 Claims, 15 Drawing Sheets

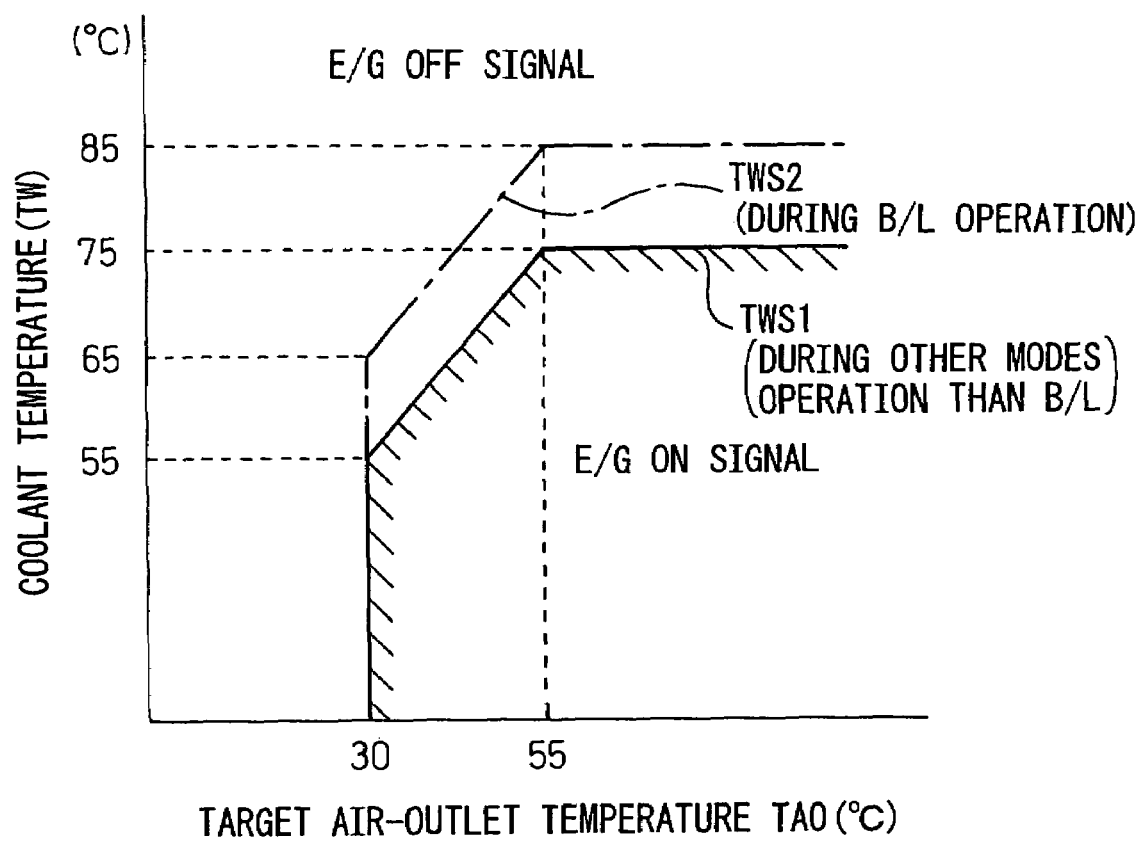

AUTOMOTIVE AIR CONDITIONING SYSTEM

BACKGROUND OF THE INVENTION

1. Technical Field of the Invention

The present invention relates to control of the heating capability of a passenger compartment heater, in an automotive air conditioning system, which can preferably be applied to hybrid vehicles.

2. Description of the Related Art

Conventionally, there are descriptions of engine operation controls to secure a required minimum coolant temperature for a heating function in automotive air conditioning systems that are applied to hybrid vehicles in which a vehicle running engine and a vehicle running motor are installed, and Japanese Patent Publication No. 3323097 describes one of the conventional examples.

In this related art, when a target air-outlet temperature TAO, for air blown out into the passenger compartment, is equal to or higher than a predetermined temperature (for example, 30° C.) and the temperature of an engine coolant, which is a heating medium for heating, is equal to or lower than a set coolant temperature (a required minimum coolant temperature) that is determined based on the target air-outlet temperature TAO, an engine operation demand signal is outputted to an engine control unit so as to force the engine into operation, whereby the temperature of the engine coolant is increased to a higher temperature than the set temperature.

Then, when the engine coolant temperature is higher than the set coolant temperature, an engine stop demand signal is outputted to the engine control unit so as to stop the engine. Thus, the engine coolant temperature is maintained at the required minimum coolant temperature to obtain the target air-outlet temperature TAO.

Incidentally, as a result of the specific test and study of the conventional example specifically, it was found that comfortable air conditioning was interrupted for the following reasons. Namely, in the conventional example, the set temperature required to obtain the target air-outlet temperature TAO is uniformly determined based only on the target air-outlet temperature TAO regardless of change in outlet mode. Consequently, with the same target air-outlet temperature TAO, the set coolant temperature remains at the same temperature whether a foot mode or a bilevel (B/L) mode is used.

Here, in contrast with the foot mode in which air is delivered only to the floor and is hence directed toward the feet of occupants, in the bilevel mode, as air is directed toward both the feet and faces of the occupants, it is desired, for the sake of comfort, to have a so-called face-cool, foot-warm outlet temperature distribution by setting the face outlet temperature lower than the foot outlet temperature.

Moreover, as the set coolant temperature is the minimum coolant temperature required to obtain the target air-outlet temperature TAO, the face-cool, foot-warm outlet temperature distribution cannot be established when the bilevel mode is used for the following reason. Namely, when attempting to set the face outlet temperature lower than the foot outlet temperature by a predetermined temperature in the bilevel mode, as the set coolant temperature is the minimum coolant temperature required to obtain the target air-outlet temperature TAO, even in the event that the foot outlet temperature reaches the target air-outlet temperature TAO, the face outlet temperature inevitably becomes lower than the target air-outlet temperature TAO by the predetermined temperature.

According to this fact, even in the event that the face-cool, foot-warm outlet temperature distribution can be established, then average temperature for the foot outlet temperature and the face outlet temperature becomes lower than the target air-outlet temperature TAO, and therefore, the passenger compartment temperature cannot be set to the set temperature. As a result, in reality, during a bilevel mode operation, air delivered from the foot outlet and air delivered from the face outlet are delivered at the same temperature, that is, the target air-outlet temperature TAO, and this lowers the comfort level provided during the bilevel mode operation.

Then, while it is possible to simply increase a target coolant temperature, that is determined based on a target air-outlet temperature TAO, by a predetermined temperature, in the event that this idea is actually put into practice, the engine coolant is heated to a higher temperature than a minimum coolant temperature required to obtain the target air-outlet temperature TAO during a foot mode operation, for example. This leads to a longer operating time of the engine and worsens the fuel economy thereof, and eventually, the advantage inherent in hybrid vehicles is lost.

SUMMARY OF THE INVENTION

The invention was made in view of these situations and an object thereof is to provide an automotive air conditioning system which can make the improvement in comfort during a bilevel mode operation compatible with the improvement in fuel economy during a foot mode operation.

With a view to achieving the object, according to an aspect of the invention, there is provided an automotive air conditioning system comprising:

a heater (51, 49) for heating air sent out into a passenger compartment;

a face outlet (16) provided on a downstream side the heater (51, 49) as viewed along the flow of air for sending out air toward the faces of occupants in the passenger compartment;

a foot outlet (17) provided on the downstream side of the heater (51, 49) as viewed along the flow of air for sending out air toward the feet of the occupants in the passenger compartment;

a target air-outlet temperature calculating unit (S4) for calculating a target air-outlet temperature (TAO) for air sent out into the passenger compartment;

an outlet mode setting unit (S6) for setting at least a bilevel mode in which the face outlet (16) and the foot outlet (17) are opened at the same time and a foot mode in which the face outlet (16) is closed, whereas the foot outlet (17) is opened;

a heating source (1, 41, 86) for heating a heating medium supplied to the heater (51, 49); and a control unit (S9) for controlling the operation of the heating source (1, 41, 86); wherein the control unit (S9) controls the operation of the heating source (1, 41, 86) such that the heating capacity of the heater (51, 49) for the target air-outlet temperature (TAO) during an operation in the bilevel mode becomes larger than the heating capacity of the heater (51, 49) for the target air-outlet temperature (TAO) during an operation in the foot mode.

According to the construction, as the foot outlet temperature can be increased higher during the bilevel mode operation than during the foot mode operation, the face outlet temperature can be decreased lower than the foot outlet temperature by that amount to thereby establish the face-cool, foot-warm temperature distribution. Consequently, the comfort during the bilevel mode operation can be improved.

In addition, as the heating capacity of the heater (51, 49) for the target air-outlet temperature (TAO) during the bilevel mode operation is made larger than the heating capacity of the heater (51, 49) during the foot mode operation, as an average value for the foot outlet temperature and the face outlet temperature, a temperature around the target air-outlet temperature (TAO) can be provided and, hence, there is no risk that the temperature control properties during the bilevel mode operation are affected.

Furthermore, it is only when the bilevel mode operation is implemented that the heating capacity of the heater (51, 49) is increased, and during the foot mode operation, the heater (51, 49) only has to be controlled so as to provide a required minimum heating capacity that corresponds to the target air-outlet temperature (TAO). Consequently, energy saving can be attained during the foot mode operation.

Thus, the attainment of energy saving during the foot mode operation and the improvement in comfort during the bilevel mode operation can be made compatible with each other.

In the automotive air conditioning system according to the invention, the heating source is a vehicle running engine (1), the heater is a hot-water heater core (51) to which a coolant is supplied from the vehicle running engine as the heating medium, and the control unit (59) may control the operation of the vehicle running engine (1) such that the temperature of the coolant for the target air-outlet temperature (TAO) during the bilevel mode operation becomes higher than the temperature of the coolant during the foot mode operation.

According to the construction, the aforesaid function and advantage can be exhibited in the automotive air conditioning system including the hot-water heater core (51) which uses the coolant of the vehicle running engine (1) as the heating medium.

In the automotive air conditioning system according to the invention, the heater is a high-pressure side radiator (49) into which a high-pressure refrigerant discharged from a compressor (41) of a refrigeration cycle (40) flows as the heating medium, the heating source is the compressor (41), and the control unit (S9) may control the operation of the compressor (41) such that the heating capacity of the high-pressure side radiator (49) for the target air-outlet temperature (TAO) during the bilevel mode operation becomes larger than the heating capacity of the high-pressure side radiator (49) for the target air-outlet temperature (TAO) during the foot mode operation.

According to this construction, the aforesaid function and advantage can be exhibited in the automotive air conditioning system in which the heater is made up of the high-pressure side radiator (49) into which the high-pressure refrigerant on the discharge side of the compressor of the refrigeration cycle (40) flows.

In the automotive air conditioning system according to the invention, the heating source is a heating source (86) for heating provided separately from the vehicle running power source, the heater is a hot-water heater core (51) to which hot water heated by the heating source (86) for heating is supplied as the heating medium, and the control unit (S9) may control the operation of the heating source (86) for heating such that the temperature of the hot water for the target air-outlet temperature (TAO) during the bilevel mode operation becomes higher than the temperature of the hot water for the target air-outlet temperature (TAO) during the foot mode operation.

According to this construction, the aforesaid function and advantage can be exhibited in the automotive air conditioning system in which the hot-water heater core (51) is used as the heater to which hot water heated by the heating source (86) for heating which is separate from the vehicle running power source is supplied.

In the automotive air conditioning system according to the invention, the heating source for heating can be made up of an electric heater (86). In addition, the heating source for heating may be made up of a combustion heater.

Next, according to another aspect of the invention, there is provided an automotive air conditioning system comprising:

a heater (87) for heating air sent out into a passenger compartment;

a face outlet (16) provided on a downstream side of the heater (87) as viewed along the flow of air for sending out air toward the faces of occupants in the passenger compartment;

a foot outlet (17) provided on the downstream side of the heater (87) as viewed along the flow of air for sending out air toward the feet of the occupants in the passenger compartment;

a target air-outlet temperature calculating unit (S4) for calculating a target air-outlet temperature (TAO) for air sent out into the passenger compartment; and an outlet mode setting unit (S6) for setting at least a bilevel mode in which the face outlet (16) and the foot outlet (17) are opened at the same time and a foot mode in which the face outlet (16) is closed, whereas the foot outlet (17) is opened;

the heater (87) being adapted to adjust the heating capacity thereof directly on their own, and comprising further;

a control unit (S9) for controlling the operation of the heating source (87); wherein the control unit (S9) controls the operation of the heater (87) such that the heating capacity of the heater (87) for the target air-outlet temperature (TAO) during the bilevel mode operation becomes larger than the heating capacity of the heater (87) for the target air-outlet temperature (TAO) during the foot mode operation.

Thus, according to the invention, as the device adapted to adjust the heating capacity thereof directly on their own is used as the heater (87), a function and an advantage which are similar to the aforesaid function and advantage can be exhibited by directly controlling the operation of the heater (87).

To be specific, an electric heater (87) can be used as such an heater, and a combustion heater may be used.

Note that reference numerals in parentheses represent relationships with corresponding specific units which are described in embodiments which will be described later on.

The present invention may be more fully understood from the description of preferred embodiments of he invention, as set forth below, together with the accompanying drawings.

BRIEF DESCRIPTION OF THE DRAWINGS

In the drawings:

FIG. 12A is a characteristic chart of a coolant temperature control for engine operation command determination;

DESCRIPTION OF THE PREFERRED EMBODIMENTS

First Embodiment

Figure 1:
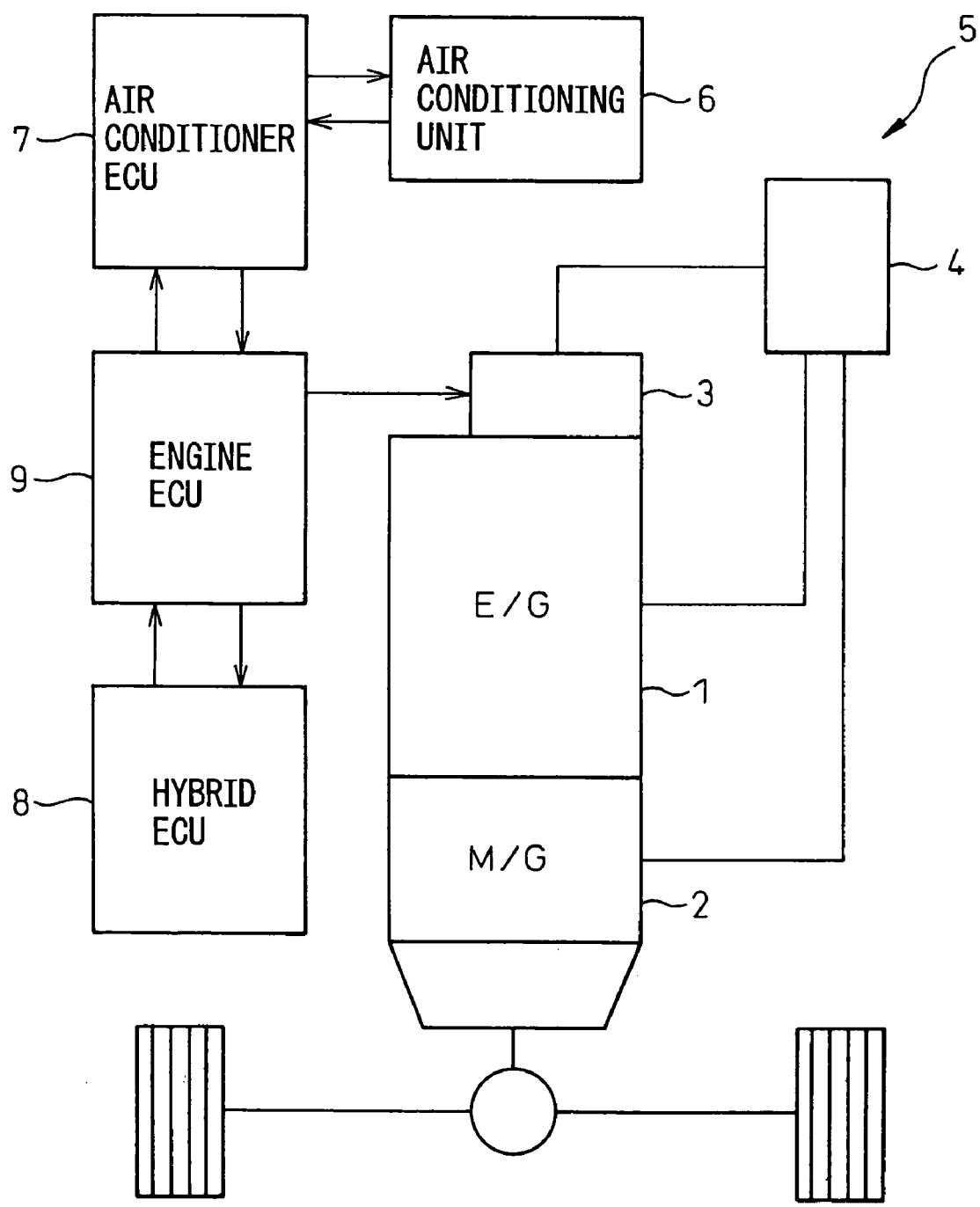
FIG. 1 is a schematic exemplary drawing illustrating the construction of a hybrid vehicle, which shows a first embodiment of the invention.
Figure 2:
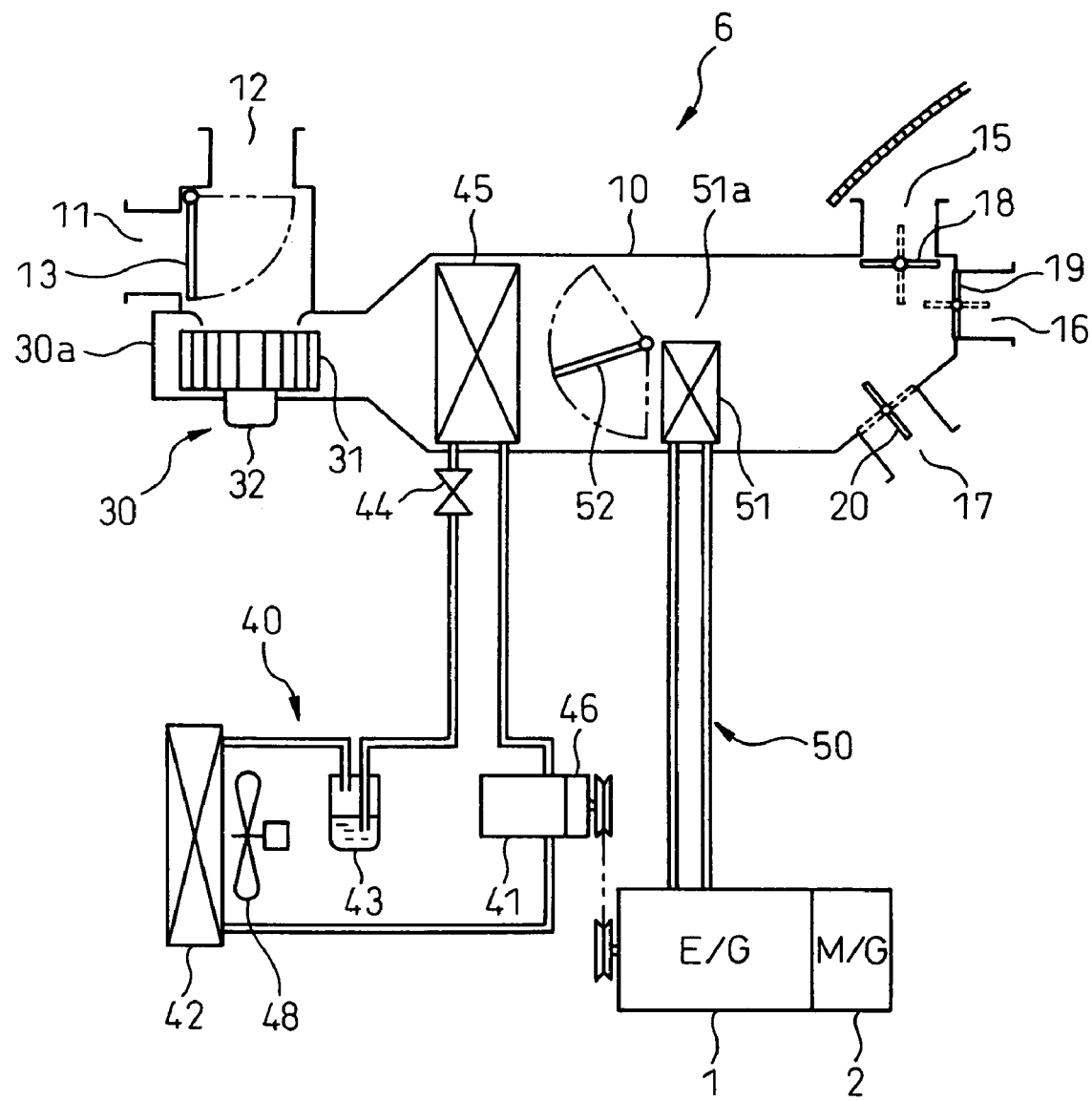
FIG. 2 is a drawing illustrating an overall construction of a hybrid vehicle air conditioning system according to the first embodiment.
Figure 3:
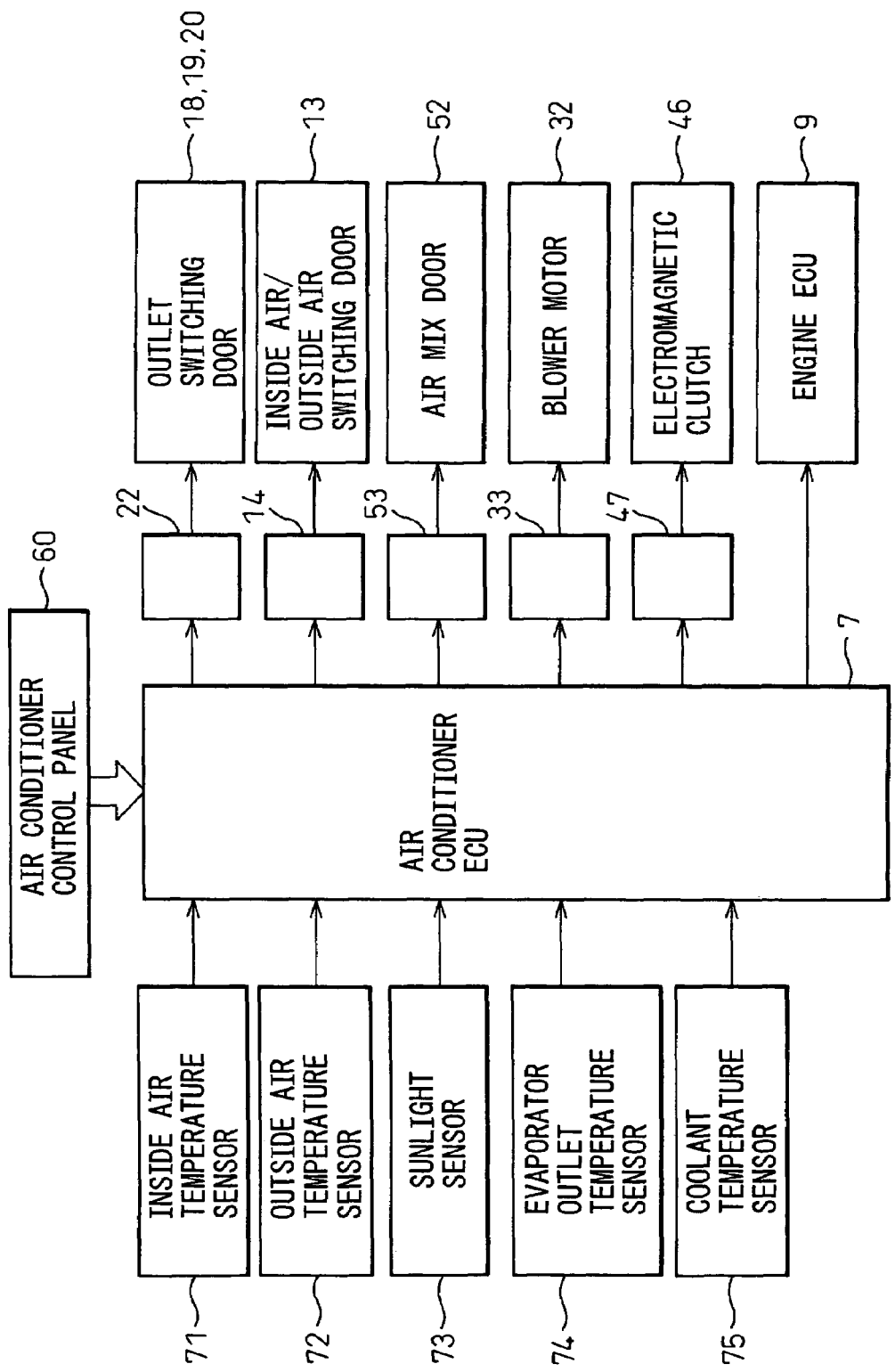
FIG. 3 is a block diagram illustrating a control system according to the first embodiment.

FIGS. 1 to 13 illustrate a first embodiment in which the invention is applied to a hybrid-vehicle air conditioning system. FIG. 1 illustrates schematically the construction of a driving mechanism for running of a hybrid vehicle, FIG. 2 shows an overall construction of a hybrid-vehicle air conditioning system, and FIG. 3 illustrates a control system of the hybrid-vehicle air conditioning system.

As shown in FIG. 1, a vehicle running water-cooled gasoline engine (hereinafter, referred to as the vehicle running engine) 1, a vehicle running motor 2 made up of an electric generator, an engine starting system 3 including a starter motor for starting the vehicle running engine 1, an ignition system and a fuel injection system and a battery 4 (a nickel hydrogen battery) 4 for supplying power to the vehicle running motor 2 and the engine starting system 3 are installed on a hybrid vehicle (a hybrid automobile) 5 according the embodiment.

Note that the vehicle running engine 1 is connected to an axle of the hybrid vehicle 5 to drive the same in such a manner as to be disengaged from the axle as required. Similarly, the vehicle running motor 2 is also connected to the axle of the hybrid vehicle 5 to drive the same in such a manner as to be disengaged from the axle as required, and it is designed that when no connection is attained between the vehicle running engine 1 and the axle, the vehicle running motor 2 is connected to the axle. Then, the vehicle running motor 2 is constructed so as to be controlled automatically (for example, inverter controlled) by a hybrid control unit (hereinafter, referred to as a hybrid ECU) 8.

Furthermore, the engine starting system 3 is constructed so as to be controlled automatically by an engine control unit (hereinafter, referred to as an engine ECU) 9 so that the combustion efficiency of gasoline(fuel) becomes optimum. Note that the engine ECU 9 controls the energization of the engine starting system 3 so as to drive the vehicle running engine 1 when the hybrid vehicle 5 needs to run normally and the battery 4 needs to be charged.

A hybrid vehicle air conditioning system according to the invention is constructed as a so-called automatic air conditioner for performing an automatic control to maintain the temperature in a passenger compartment of the hybrid vehicle 5 at a set temperature at all times by automatically controlling an air conditioning device (an actuator) of an air conditioning unit 6 for conditioning air inside the passenger compartment by an air conditioner control unit (hereinafter, referred to as an air conditioner ECU).

As shown in FIG. 2, the air conditioning unit 6 includes an air conditioning case 10 for forming an air passageway for introducing conditioned air toward the interior of the passenger compartment of the hybrid vehicle 5. This air conditioning case 10 is disposed inside a vehicle instrument panel located at a front part of the passenger compartment. A blower 30 generates an air flow directed to the interior of the passenger compartment in the air conditioning case 10 and is, specifically speaking, made up of a centrifugal blower.

Furthermore, the air conditioning unit 6 includes a refrigeration cycle 40 for cooling air that flows within the air conditioning case 10 so as to cool the interior of the passenger compartment and an engine coolant circuit (a hot water circuit) 50 for heating the air that flows within the air conditioning case 10 so as to heat the interior of the passenger compartment.

A most upstream side (a windward side) of the air conditioning case 10 constitutes an air inlet switching portion, where an inside air inlet 11 for taking in inside air (air in the passenger compartment), an outside air inlet 12 for taking in outside air (air outside the passenger compartment) and an inside air/outside air switching door 13 for opening and closing the both inlets 11, 12 are provided. This inside air/outside air switching door 13 is an inside air/outside air switching unit and is, specifically speaking, made up of a rotational plate door. In addition, the inside air/outside air switching door 13 is driven by an actuator 14 (FIG. 3) such as a servo motor to switch an inlet mode between an inside air recirculation mode and an outside air introduction mode.

In addition, a most downstream side (a leeward side) of the air conditioning case 10 constitutes an outlet switching portion, where a defroster outlet 15, a face outlet 16 and a foot outlet 17 are formed. Then, mainly hot air is sent out toward an inner side of a windscreen of the hybrid vehicle 5 from the defroster outlet 15. In addition, mainly cold air is sent out toward the faces (upper body) of occupants from the face outlet. Furthermore, mainly hot air is sent out toward the feet of the occupants from the foot outlet 17.

Then, three outlet switching doors 18, 19, 20 are rotationally disposed at entrance portions of the outlets 15 to 17 as outlet switching devices, respectively, so as to open and close the outlets 15 to 17. These outlet switching doors 18, 19, 20 are driven in an interlocking fashion by a common actuator 22 (FIG. 3) made up of a servo motor or the like via a link mechanism.

To be specific, the outlet switching doors 18, 19, 20 switch to set any one mode of a face (FACE) mode, a bilevel (B/L) mode, a foot (FOOT) mode, a foot/defroster (F/D) mode and a defroster (DEF) mode as the outlet mode.

The centrifugal blower 30 has a centrifugal fan 31 accommodated rotationally within a scroll case 30a which is constructed integrally with the air conditioning case 10 and a blower motor 32 for driving to rotate the centrifugal fan 31. The rotational speed of the blower motor 32 is controlled based on a blower voltage that is applied thereto via a blower driving circuit 33 (FIG. 3), whereby the amount of air delivered by the centrifugal fan 31 is controlled.

The refrigeration cycle 40 includes a compressor belt driven by the vehicle running engine 1 for compressing a refrigerant, a condenser 42 for condensing the refrigerant so compressed, a receiver-dehydrator 43 for removing moisture from refrigerant so as to allow resultant liquid refrigerant to flow downstream, an expansion valve (a pressure reducing unit) 44 for reducing the pressure of liquid refrigerant to allow for its expansion, an evaporator 45 for vaporizing liquid refrigerant so pressure reduced and expanded and refrigerant piping which connects these constituent devices with each other.

Of these devices, the evaporator 45 is disposed so as to extend transversely across the internal air passageway within the air conditioning case 10 and functions as a cooling heat exchanger for cooling and dehumidifying air sent from the blower 30. In addition, an electromagnetic clutch 46 is connected to the compressor 41 as a clutch device for engaging and disengaging the transmission of rotational power from the vehicle running engine 1.

The energization of the electromagnetic clutch 46 is controlled by a clutch driving circuit 47 (FIG. 3). Then, when the electromagnetic clutch 46 is energized (ON), the rotational power of the vehicle driving engine 1 is transmitted to the compressor 41, and an air cooling action is started by the evaporator 45 whereas, when the energization of the electromagnetic clutch 46 is stopped (OFF), the power transmission between the vehicle driving engine 1 and the compressor 41 is cut off, whereby the air cooling action by the evaporator 45 is stopped.

The condenser 42 is disposed at a place where it can easily receive ram air generated when the hybrid vehicle 5 runs and constitutes a high-pressure side radiator where a heat exchange is implemented between refrigerant flowing therein and outside air sent in by a cooling fan 48 and the ram air so received.

The coolant circuit 50 is a circuit through which high-temperature coolant (hot water) heated in a water jacket of the vehicle running engine 1 is circulated by a water pump, not shown, and has a radiator, a thermostat (which are both not shown) and a heater core 51. This heater core 51 is such as to constitute a heater for air that is sent out into the interior of the passenger compartment and is disposed downstream of the eveporator 45 within the air conditioning case 10. Then, the heater core 51 heats air (cold air) that has passed through the evaporator 45 using the hot coolant from the vehicle running engine 1 as the heat source.

To be more specific, the heater core 51 is disposed at a location downstream of the evaporator 45 in such a manner as to define a bypass passageway 51a to one side thereof. An air mix door 52 is disposed upstream the heater core 51 along the flow of air in such a manner as to be rotated by an actuator 53 (FIG. 3) such as a servo motor.

This air mix door 52 functions as an outlet temperature adjusting unit for adjusting the outlet temperature of air that is sent out into the passenger compartment by adjusting a ratio between the amount of air (the amount of hot air) which passes through the heater core 51 and the amount of air (the amount of cold air) which passes through the bypass passageway 51a by selecting a rotational position.

Next, the configuration of a control system of the embodiment will be described based on FIGS. 1, 3 and 4. A communication signal outputted from the engine ECU 9, operation signals (switch signals) from various types of operation members 61 to 69 on an air conditioning control panel 60 provided in the vicinity of a vehicle instrument panel located at a front part of the passenger compartment and sensor signals from various types of sensors 71 to 75, are inputted into the air conditioner ECU 7.

Figure 4:
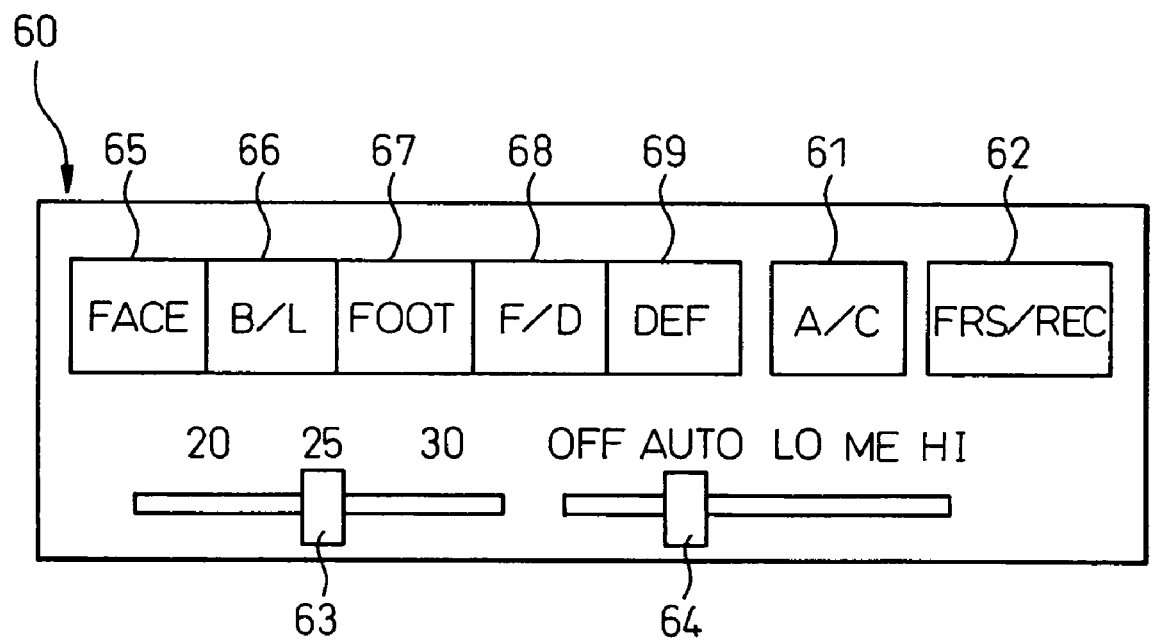
FIG. 4 is a front view of an air conditioning control panel according to the first embodiment.

Here, specifically speaking, as shown in FIG. 4, the various types of operation members 61 to 69 on the air conditioning control panel 60 are such as an air conditioner (A/C) switch 61 for commanding start and stop of the refrigeration cycle 40 (the compressor 41), an inlet switching switch 62 for switching the inlet (inside and outside air) mode, a lever-like temperature setting member 63 for setting the temperature within the passenger compartment to a desired temperature, a lever-like blower air amount controlling member 64 for controlling the amount of air sent in by the blower 30 and an outlet switching switches 65 to 69 for switching the outlet mode.

Then, to be specific, these outlet switching switches 65 to 69 are such as a face (FACE) switch 65 for setting a face mode, a bilevel (B/L) switch 66 for setting a bilevel mode, a foot (FOOT) switch 67 for setting a foot mode, a foot/defroster (F/D) switch 68 for setting a foot/defroster mode and a defroster (DEF) switch 69 for setting a defroster mode.

In addition, to be specific, the various types of sensors 71 to 75 are, as shown in FIG. 3, such as an inside air temperature sensor 71 for detecting the temperature of inside air within the passenger compartment, an outside air temperature sensor 72 for detecting the temperature of outside air, a sunlight sensor 73 for detecting the amount of sunlight streamed into the passenger compartment, an evaporator outlet temperature sensor 74 for detecting the outlet air temperature from the evaporator 45 and a coolant temperature sensor 75 for detecting the temperature of coolant that flows into the heater core 51.

Note that the air conditioner ECU 7 is, as is known, configured using a microprocessor made up of CPU, ROM and RAM and peripheral circuits and is adapted to be activated by being supplied with DC current from the battery 4 when an ignition switch (not shown) of the vehicle running engine 1 of the hybrid vehicle 5 is switched on (ON).

Figure 5:
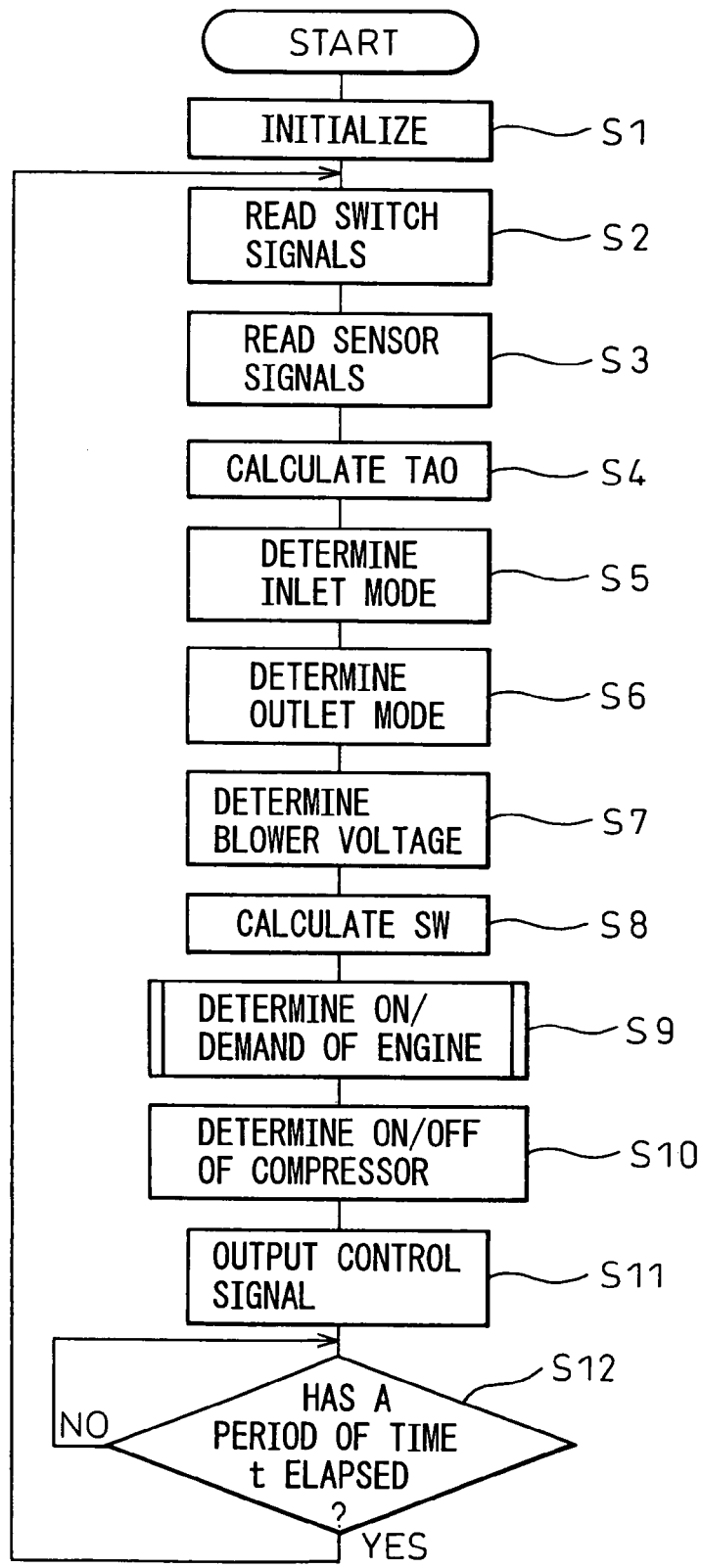
FIG. 5 is a flowchart illustrating a basic control process by an air conditioner ECU according to the first embodiment.

Next, a control process of the air conditioner ECU 7 according to the embodiment will be described based on FIGS. 5 to 10. Here, FIG. 5 is a flowchart illustrating a basic air conditioning process by the air conditioner ECU 7. Firstly, when the ignition switch is switched on (ON) so as to supply the air conditioner ECU 7 with DC power source, a routine illustrated in FIG. 5 is activated, and various types of initializations are implemented (step S1).

Next, operation signals (switch signals) from the various operation members 61 to 69 on the air conditioning control panel 60 are read in (step S2). Next, sensor signal from the respective sensors 71 to 75 are read in (step S3).

Next, a target air-outlet temperature TAO of air sent out into the passenger compartment is calculated based on the following formula (1) stored in ROM in advance. This target air-outlet temperature TAO is an outlet temperature needed to maintain the interior of the passenger compartment to a set temperature set by the temperature setting member 63 irrespective of change in air conditioning heat load of the vehicle.

$$TAO = Kset \times Tset - KR \times TR - KAM \times TAM - KS \times TS + C \quad (1)$$

where Tset is a set temperature set by the temperature setting member 63, TR is an inside air temperature detected by the inside air temperature sensor 71, TAM is an outside air temperature detected by the outside air temperature sensor 72, and TS is a sunlight amount detected by the sunlight sensor 73. In addition, Kset, KR, KAM and KS are control gains, respectively, and C is a constant for correction.

Figure 6:
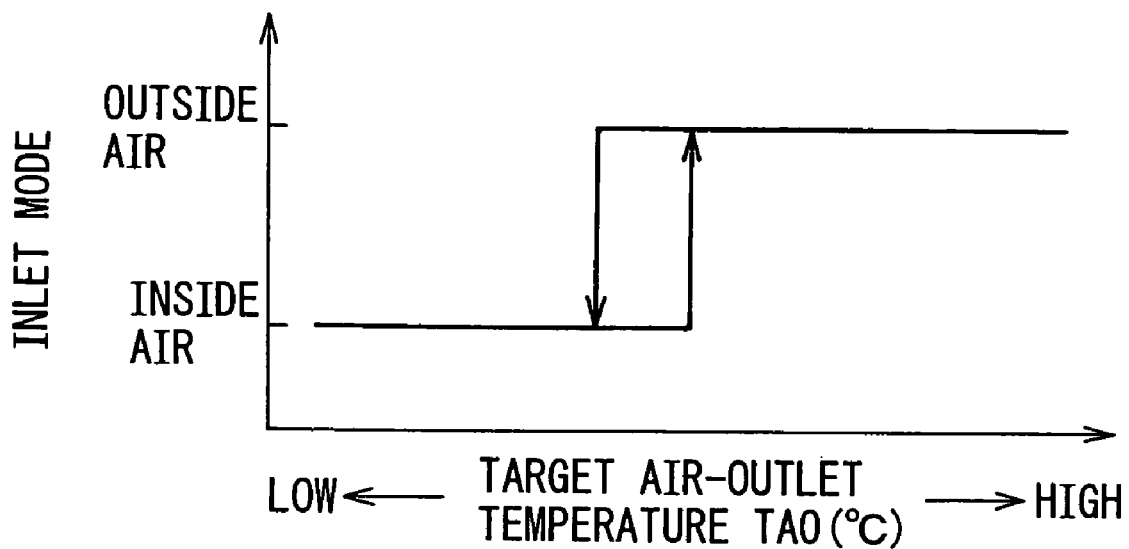
FIG. 6 is a control characteristic chart of an inlet mode according to the first embodiment.

Next, in step S5, the inlet mode is determined. Here, to be specific, the inlet mode is switched from an inside air circulation mode to an outside air induction mode as the target air-outlet temperature TAO changes from a low temperature area to a high temperature area as shown in a characteristic chart stored in ROM in advance which is shown in FIG. 6.

Note that the inside air circulation mode is an inlet mode for letting in inside air from the inside air inlet 11 by operating the inside air/outside air switching door 13 to a position (a position indicated by chained lines in FIG. 2) where the outside air inlet 12 is closed, whereas the inside air inlet 11 is opened. In addition, the outside air induction mode is an inlet mode for letting in outside air from the outside air inlet 12 by operating the inside air/outside air switching door 13 to a position (position indicated by solid lines in FIG. 2) where the inside air inlet 11 is closed, whereas the outside air inlet 12 is opened.

An inside air/outside air mixing mode for letting in both inside air and outside air at the same time may be set between the inside air circulation mode and the outside air induction mode.

In addition, by operating the inlet switching switch 62 on the air conditioning control panel 60, the inside air circulation mode and the outside air induction mode can be set freely, in a manual fashion, as the occupant desires.

Figure 7:
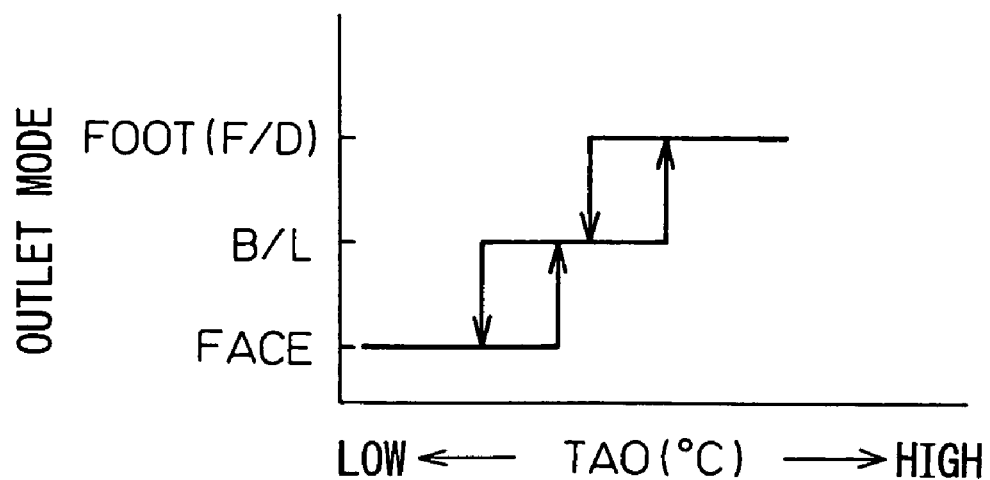
FIG. 7 is a control characteristic chart of an outlet mode according to the first embodiment.

Next, in step S6, the outlet mode is determined. Here, the outlet mode is determined according to the target air-outlet temperature TAO as shown in a characteristic chart stored in ROM in advance which is shown in FIG. 7. To be more specific, the outlet mode is sequentially changed to be set from the face mode, the bilevel mode and the foot mode (or the foot/defroster mode) in that order as the target air-outlet temperature TAO changes from the low temperature area to the high temperature area.

Here, the face mode is an outlet mode for sending out air (mainly cold air) from the face outlet 16 toward the faces of the occupants in the passenger compartment, the bilevel mode is an outlet mode for sending out air from both the face outlet 16 and the foot outlet 17 toward the feet and faces of the occupants in the passenger compartment, and the foot mode is an outlet mode for sending out air (mainly hot air) from the foot outlet 17 toward the feet of the occupants in the passenger compartment.

Note that in the high temperature area where the foot mode is selected, when a condition where the windscreen of the vehicle tends to be fogged (a condition where the temperature of the windscreen in particular decreases) is determined, the outlet mode is changed from the foot mode to the foot/defroster mode. Here, the foot/defroster mode is an outlet mode where air (mainly hot air) is sent out from the defroster outlet 15 toward the windscreen of the vehicle, whereas air (mainly hot air) is sent-out from the foot outlet 17 toward the feet of the occupants in the passenger compartment, whereby the heating of the feet of the occupants and the windscreen defogging operation can both be exhibited.

In addition, by operating the outlet switching switches 65 to 69 on the air conditioning control panel 60, in addition to the face mode, the bilevel mode, the foot mode and the foot/defroster mode, the defroster mode (in total, five outlet modes) can freely manually be set as the occupant desires. The defroster mode is an outlet mode for sending out air (mainly hot air) from the defroster outlet 15 toward the windscreen of the vehicle.

Figure 8:
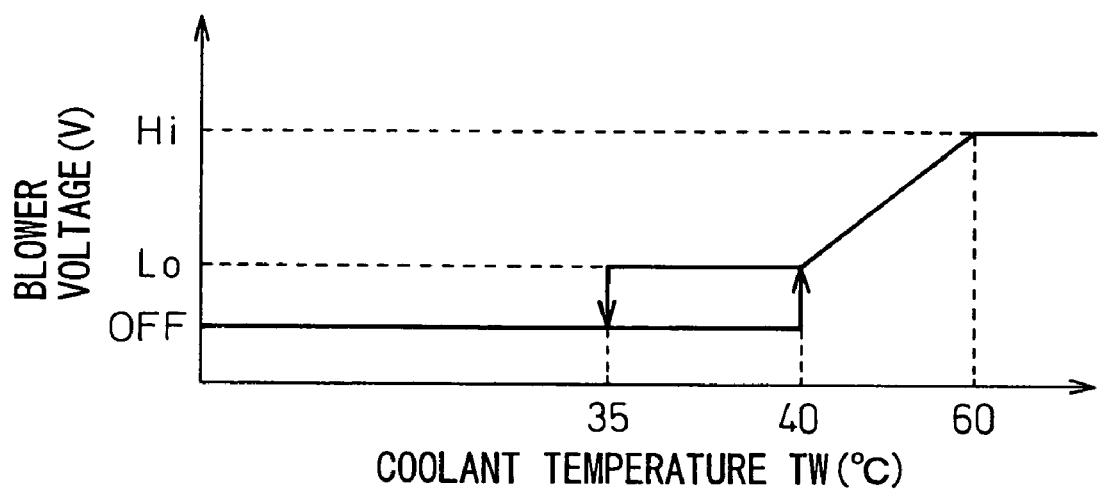
FIG. 8 is a control characteristic chart of a blower voltage during a warming up control operation according to the first embodiment.

Next, in step S7, the blower voltage applied to the blower motor 32 is determined. As one of operation processes for determining the blower voltage there exists a warming up process. To be specific, when any one of the bilevel mode, the foot mode and the foot/defroster mode is selected as the outlet mode, the target air-outlet temperature TAO is in the high temperature area where the temperature is higher than a predetermined temperature (a heating side area) and, furthermore, the coolant temperature TW detected by the coolant temperature sensor 75 is lower than a predetermined temperature, it is determined that the requirements for a warming up control (a blower delay control) are met, and a warming up control is implemented. This warming up control is such as to determine the blower voltage such that the blower voltage increases gradually in accordance with a characteristic chart stored in ROM in advance which is shown in FIG. 8 as the coolant temperature TW increases.

Figure 9:
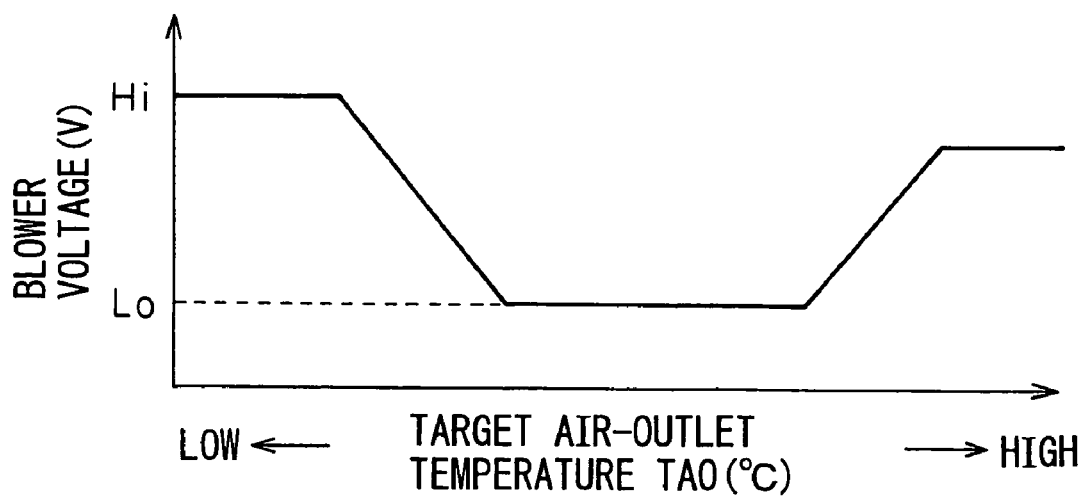
FIG. 9 is a control characteristic chart of a blower voltage during a normal control operation.

Then, when the coolant temperature TW has increased to the predetermined temperature, for example, 60° C. or higher, the warming up control is completed and, thereafter, the blower voltage is determined in accordance with a characteristic chart for a normal control operation that corresponds to the target air-outlet temperature TAO. To be specific, the blower voltage is determined so as to change substantially in a V-shape to correspond to the fluctuation of the target air-outlet temperature TAO as shown in a characteristic chart stored in ROM in advance which is shown in FIG. 9.

Note that in determining the blower voltage through an automatic control with the blower air amount switching member 64 on the air conditioning control panel 60 being operated to be located at an AUTO position (an automatic control position), by operating the blower air amount switching member 64 to any other position than the AUTO position, the blower voltage can be set manually as below. Namely, by operating the blower air amount switching member 64 to be located to a LO (low speed) position, the blower voltage becomes a minimum value, whereby a minimum blower air amount can be set.

In addition, by operating the blower air amount switching member 64 to be located at an ME (medium speed) position, the blower voltage becomes an intermediate value, whereby an intermediate air amount can be set. In addition, by operating the blower air amount switching member 64 to be located at an HI (high speed) position, the bower voltage becomes a maximum volume, whereby a maximum air amount can be set. Note that by operating the blower air amount member 64 to be located at an OFF (stop) position, the energization to the blower motor 32 is stopped, whereby the blower 30 can be stopped.

Next, in step S8, a target door opening (SW) of the air mix door 52 is calculated based on the following formula (2) that is stored in ROM in advance.

$$SW = \{(TAO - TE)/(TW - TE)\} \times 100(\%) \quad (2)$$

where TE is an evaporator outlet temperature detected by the evaporator outlet temperature sensor 74, and TW is a coolant temperature detected by the coolant temperature sensor 75.

Then, when calculated as SW≦0 (%), the air mix door 52 is controlled to be located at a maximum cooling position where the whole of cold air from the evaporator 45 is caused to flow to the bypass passageway 51a by fully closing the air passageway in the heater core 51 while fully opening the bypass passageway 51a of the heater core 51. In addition, when calculated as SW≧100 (%), the air mix door 52 is controlled to be located at a maximum heating position where the whole of cold air from the evaporator 45 is caused to flow to the heater core 51 by fully closing the bypass passageway 51a while fully opening the air passageway in the heater core 51.

Furthermore, when calculated as 0(%)<SW<100(%), the air mix door 52 is controlled to be located at an intermediate opening position (temperature controlling position) where part of cold air from the evaporator 4 is caused to flow to the air passageway in the heater core 51 while the rest of the cold air is caused to flow to the bypass passageway 51a.

Next, in step S9, the operation demand determination control of the vehicle running engine 1 is implemented. Namely, an engine operation demand determination is implemented where whether an engine operation demand (E/GON) signal which demands the start of the vehicle engine 1 is outputted or whether an engine stop demand (E/GOFF) signal which demands the stop of the operation of the vehicle running engine 1 is outputted is determined. The details of the determination control in step S9 will be described by reference to a sub-routine shown in FIG. 11 which will be described later on.

Figure 10:
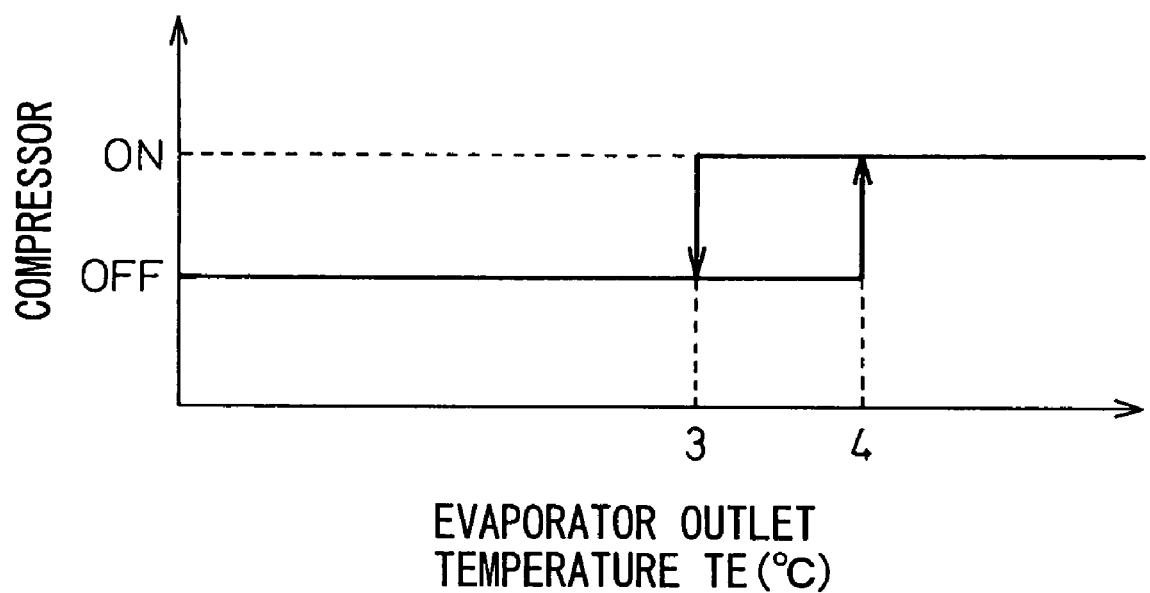
FIG. 10 is a control characteristic chart of a compressor intermittent operation according to the first embodiment.

Next, in step S10, the operating state (ON/OFF) of the compressor 41 when the air conditioner switch 61 is ON is determined. Namely, the start and stop of the compressor 41 is determined based on an evaporator outlet temperature detected by the evaporator outlet temperature sensor 74. To be more specific, as shown in a characteristic chart, stored in ROM, which is shown in FIG. 10, when the evaporator outlet temperature TE is equal to or higher than a first set temperature (for example, 4° C.), the electromagnetic clutch 46 is energized (ON), and the compressor 41 and hence the refrigeration cycle 40 are activated (ON), whereby the evaporator 45 is allowed to exhibit an air cooling operation.

In addition, when the evaporator outlet temperature TE is equal to or lower than a second set temperature (for example, 3° C) which is a lower temperature than the first set temperature, the energization to the electromagnetic clutch 46 is cut off (OFF), and the operation of the compressor 41 and hence the refrigeration cycle 40 is stopped (OFF), whereby the air cooling operation by the evaporator 45 is stopped, frosting of the evaporator 45 thereby being prevented.

Next, in step S11, various types of control signals are outputted. Namely, in order to obtain the respective control states calculated or determined in the respective steps S5 to S10, control signals are outputted to the actuators 14, 22, 53, the blower driving circuit 33 and the clutch driving circuit 47, and the engine operation demand (E/GON) signal or engine stop demand (E/GOFF) signal is outputted to the engine ECU 9.

Then, in step S12, wait for the elapse of a control cycle time t (for example, a period of time between 0.5 sec to 2.5 sec), and then return to the control process in step S2.

Next, the control process of the engine operation demand determination will be described in a specific fashion. Note that the engine operation demand determination control process is roughly divided into (1) a control process for securing a required minimum coolant temperature at the time of heating and (2) a control process for operating the compressor 41 at the time of cooling (in other words, a control process for suppressing the evaporator outlet temperature to within a predetermined upper limit value).

These two control processes (1), (2) are executed in parallel at all times and, when an engine operation demand (E/GON) signal is transmitted to the engine ECU 9 from either of these two control processes, the vehicle running engine 1 is put in operation. In contrast with this, engine stop command (E/GOFF) signals are transmitted to the engine ECU 9 from both the two control processes (1), (2), there is no case where the vehicle running engine 1 is started by a demand from the air conditioner side.

Note that the latter control process (2) is an engine operation demand determination for the operation of the compressor, and as it does not directly relates to the invention, a specific description thereof will be omitted. Hereinafter, the former control process (1) according to the embodiment will be described in detail based on FIGS. 11 and 12A.

Figure 11:
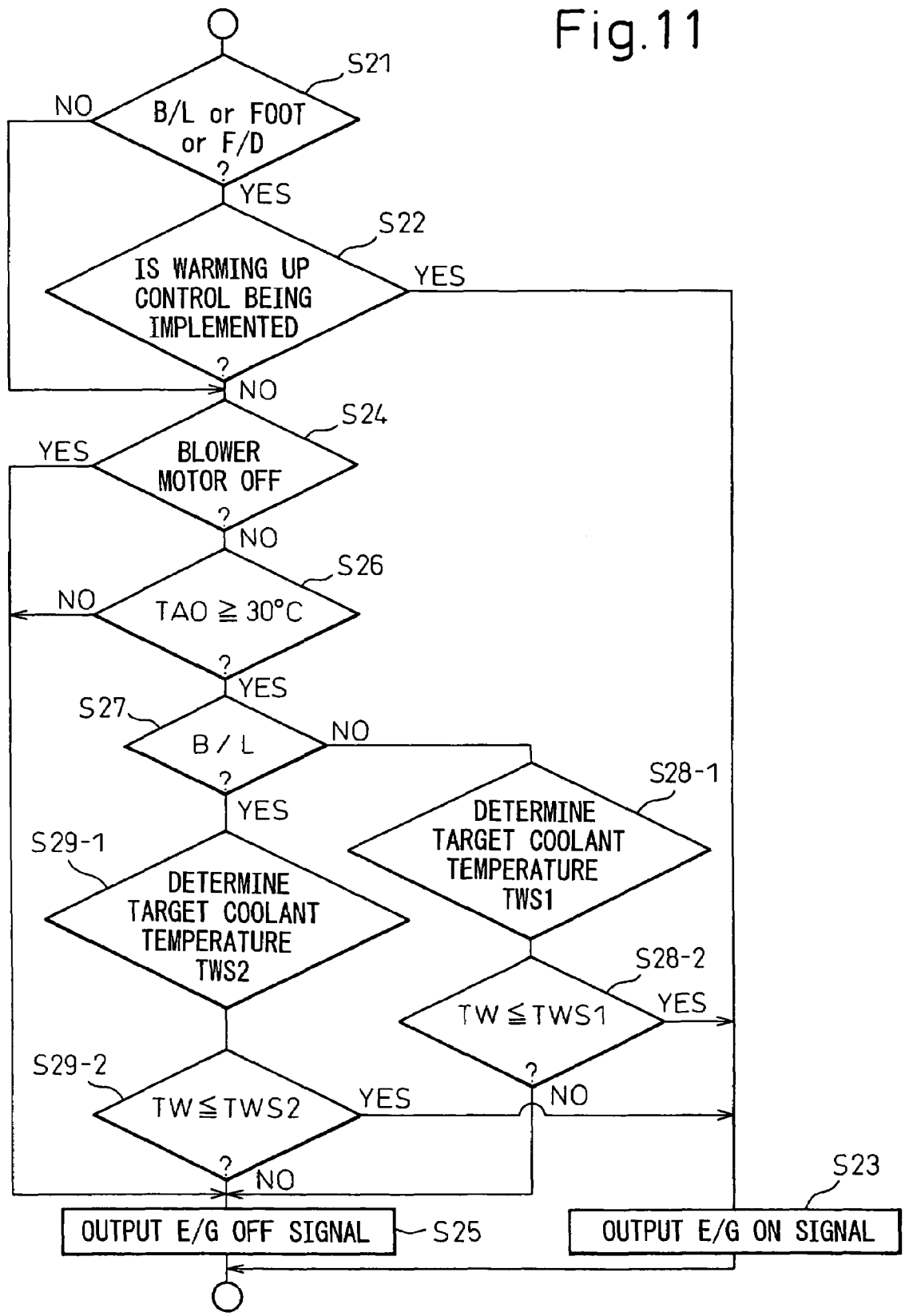
FIG. 11 is a flowchart illustrating a control process of an engine operation command determination according to the first embodiment.

FIG. 11 is a flowchart illustrating a sub-routine for executing the former control process (1) and, in the sub-routine shown in FIG. 11, firstly, whether or not the outlet mode is set to any one of the bilevel mode, the foot mode and the foot/defroster mode is determined (step S21). Namely, whether or not the outlet mode where the aforesaid warming up control shown in FIG. 8 is set, is determined.

If the determination is positive, whether or not the aforesaid warming up control shown in FIG. 8 is being executed is determined (step S22). Then, if the warming up control is being implemented, an engine operation demand (E/GON) signal is transmitted to the engine ECU 9 (step S23), whereby the vehicle running engine 1 is started, so that the engine coolant temperature is increased without any delay.

On the other hand, if the determinations in steps 21 and 22 are negative, proceed to step S24, where whether or not the blower motor is OFF (=blower air amount:0) or whether or not the blower air amount switching member 64 is operated to be located at an OFF position is determined. If the determination is positive, an engine stop demand (E/GOFF) signal is transmitted (step S25) is sent to the engine ECU (step s25).

In contrast to this, if the determination in step S34 is negative, whether or not the target air-outlet temperature determined in step S4 shown in FIG. 5 is equal to or higher than a predetermined temperature (for example, 30° C.) is determined (step S26).

Note that as, in the engine ECU 9, the operation and stop of the vehicle running engine 1 is controlled such that the coolant temperature TW detected by the coolant temperature sensor 75 becomes equal to or higher than a predetermined temperature (for example, 40° C.), if the target air-outlet temperature TAO is lower than the predetermined temperature (for example, 30° C.), with a view to securing a required coolant temperature on the air conditioning side, there is no need to output the vehicle running engine 1 operation demand. Consequently, if the determination in step S26 is negative, then, proceed to step S25, and an engine stop demand (E/GOFF) signal is transmitted to the engine ECU 9. On the other hand, if positive in step S26, at step S27, whether or not the outlet mode is in the bilevel mode is determined. If the outlet mode is not in the bilevel mode, namely, if the outlet mode is in any of the face, foot/defroster and defroster modes, proceed to step S28-1, a target coolant temperature is determined. TWS1 which change as indicated by a solid line in FIG. 12A as the target outlet temperature TAO changes is determined as the target coolant temperature. Next, at step S28-2, whether or not the coolant temperature TW detected by the coolant temperature sensor 75 is equal to or lower than a first target coolant temperature TWS1 is determined.

Here, the first target coolant temperature TWS1 is a minimum temperature needed to increase the temperature of air sent out into the passenger compartment to the target outlet temperature TAO. As shown in FIG. 12A, this first target coolant temperature TWS1 has a characteristic that it increases as the target outlet temperature increases. To be more specific, when TAO=30° C., TWS1=55° C., and when TAO is in the range o 30° C. to 55° C., TWS1 increases proportionally as TAO increases, whereby when TAO=55° C., TSW1=75° C. When TAO is in a relatively high temperature range of 55° C. or higher, TWS1 is characteristically maintained at 75° C.

In FIG. 12A, a second target coolant temperature TSW2 is a target coolant temperature for a bilevel mode operation and is characteristically caused to deviate toward the high temperature side than the first target coolant temperature TWS1 by a predetermined temperature (for example, 10° C. in this example).

If the determination in step S28 is positive, then, at step S23, an engine operation demand (E/GON) signal is transmitted to the engine ECU 9 so as to start the vehicle running engine 1, so that the engine coolant is increased to the first target coolant temperature TWS1 quickly. In contrast to this, if the determination in step S28 is negative, then, at step S25, an engine stop demand (E/GOFF) signal is transmitted to the engine ECU 9.

On the other hand, if the outlet mode is determined to be in the bilevel mode, then, at step S29-1, a target coolant temperature is set. TWS2 which changes as indicated by chained lines in FIG. 12A as the target air-outlet temperature TAO changes is determined as a target coolant temperature in this case. Next, at step S29-2, whether or not the target coolant temperature so set is equal to or lower than TWS2 is determined. If the determination is positive, then, at step S23, and an engine operation demand (E/GON) signal is transmitted to the engine ECU 9 so as to start the vehicle running engine 1, so that the engine coolant is increased to the second target coolant temperature TWS2 quickly. In contrast with this, if the determination in step S29-2 is negative, then, at step S25, an engine stop demand (E/GOFF) signal is transmitted to the engine ECU 29.

Incidentally, as the second target coolant temperature TWS2 is a set coolant temperature exclusively for the bilevel mode operation and is characteristically caused to deviate toward the high temperature side by the predetermined temperature (for example, 10° C. in this example), the foot outlet temperature from the foot outlet 17 can be increased by a difference in temperature between the first target coolant temperature TWS1 and the second target coolant temperature TWS2 during the bilevel mode operation when compared with the foot mode operation or the like.

Then, during the bilevel mode operation the face outlet temperature can be decreased to a degree at which the foot outlet temperature is increased during the bilevel mode operation, whereby the comfort during the bilevel mode operation can be improved by a face-cool, foot-warm outlet temperature distribution obtained.

Here, as the degree to which the foot outlet temperature is increased relative to the predetermined target air-outlet temperature TAO during the bilevel mode operation is offset against the degree to which the face outlet temperature is decreased during the bilevel mode operation during the bilevel mode operation, as a whole, the passenger compartment can be maintained to the set temperature. Consequently, there is no risk that the control properties of the passenger compartment temperature are affected.

Furthermore, the second target coolant temperature TWS2 is a set temperature exclusively used for the bilevel mode operation, and the engine operation demand is determined using the first target coolant temperature TWS1 which is lower by the predetermined temperature than the second target coolant temperature in the other outlet modes than the bilevel mode. As this first target coolant temperature TWS1 determines the engine operation demand as the minimum coolant temperature needed to obtain the predetermined target air-outlet temperature TAO, there is no drawback that, in the outlet modes other than the bilevel mode, the engine coolant temperature is increased higher than required and heat is wasted. Consequently, the fuel economy of the vehicle running engine 1 is prevented from being damaged by the improvement in comfort during the bilevel mode operation. Thus, the improved comfort and secured fuel economy during the bilevel mode operation can be made compatible.

Figure 13:
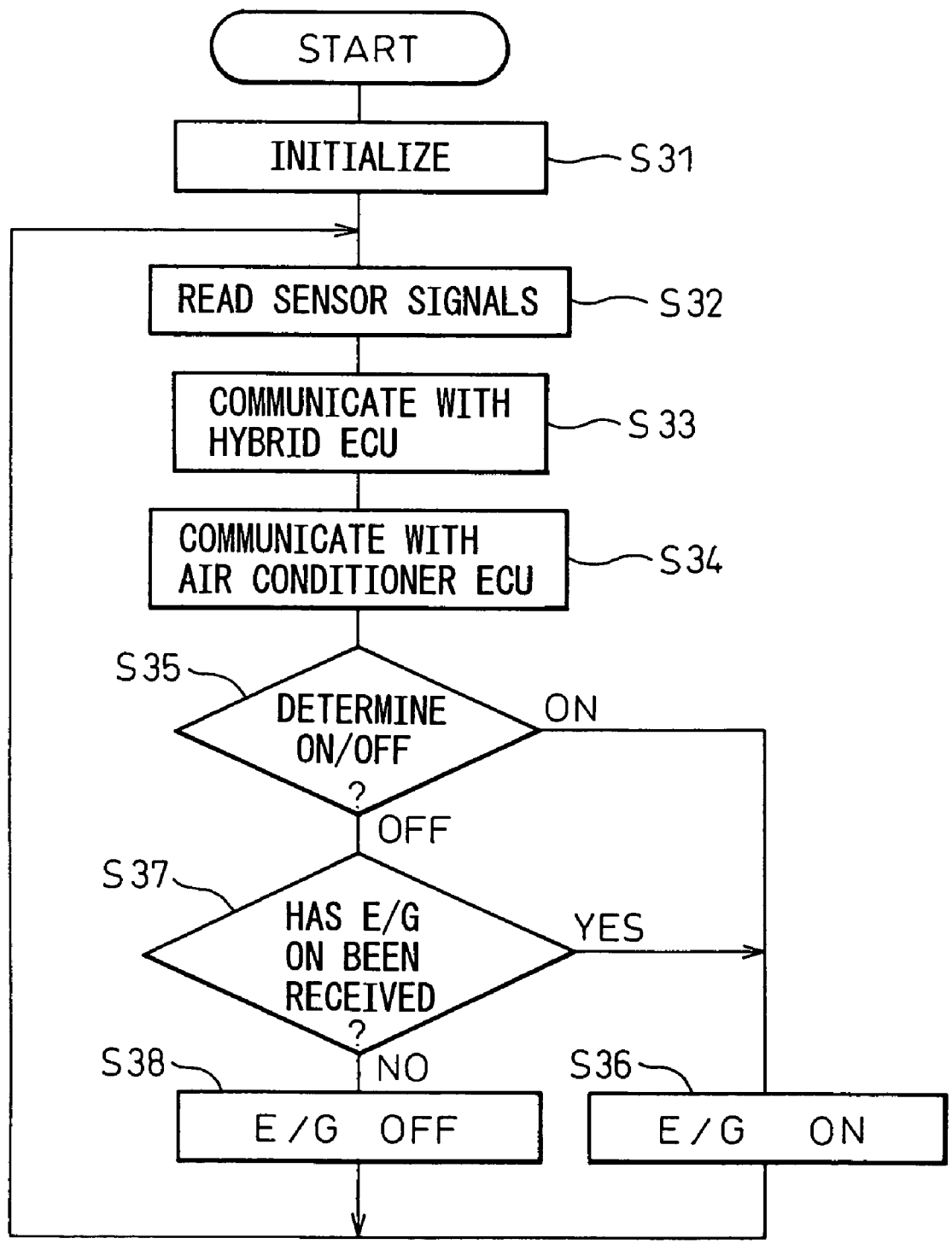
FIG. 13 is a flowchart illustrating a basic control process by an engine ECU.

Next, a control process of the engine ECU 9 according to the embodiment will be described based on FIG. 13. Here, FIG. 13 is a flowchart illustrating a basic control process by the engine ECU 9. Note that respective sensor signals as operating state detecting means for detecting the operating state of the hybrid vehicle 5 and communication signals from the air conditioner ECU 7 and hybrid ECU 8 are inputted into to the engine ECU 9.

Note that used as sensors are an engine rotational speed sensor, a vehicle speed sensor, a throttle opening sensor, a battery voltmeter and a coolant sensor (none of them is shown). Then, as is known, a microprocessor including CPU, ROM, RAM or the like is provided in the engine ECU 9.

Firstly, a routine shown in FIG. 13 is activated when the ignition switch of the vehicle running engine 1 is switched on (ON) to supply direct current power source to the engine ECU 9 and to implement various types of initializations (step S131). Following this, respective sensor signals are read in (step S32) Following this, a communication (transmission and reception) with the hybrid ECU 8 is implemented (step S33). Following this, a communication (transmission and reception) with the air conditioner ECU 7 is implemented (step S34). Following this, the ON (operation) and OFF (stop) of the vehicle running engine 1 is determined (step S35). If the determination results in ON (operation), a control signal is outputted to the engine starting system 3 including the starter motor and ignition system, instructing the same to start (ON) the vehicle running engine 1 (step S36). Thereafter, the process returns to step S32.

In addition, if the determination in step S35 results in OFF, whether or not an operation demand (E/GON) signal demanding the start of the vehicle running engine 1 has been received from the air conditioner ECU 7 is determined (step S37). If the determination results in NO, as this means that a stop demand (E/GOFF) signal has been received from the air conditioner ECU 7, a control signal is outputted to the engine starting system 3, instructing the same to stop (OFF) the operation of the vehicle running engine 1 (step S38). Thereafter, the process returns to step S32.

In addition, if the determination in step S37 results in NO, move to step S36, and a control signal is outputted to the engine starting system 3, instructing the same to start (ON) the vehicle running engine 1.

While, in the first embodiment, the outlet mode is divided into two such as a bilevel mode and the other outlet modes, and as shown in FIG. 12A, the first target coolant temperature TWS1 is used for the outlet modes other than the bilevel mode, whereas the second target coolant temperature TWS2 which is characteristically caused to deviate toward the high temperature side by the predetermined temperature is used for the bilevel mode, this construction may be modified as below.

Figure 12B:
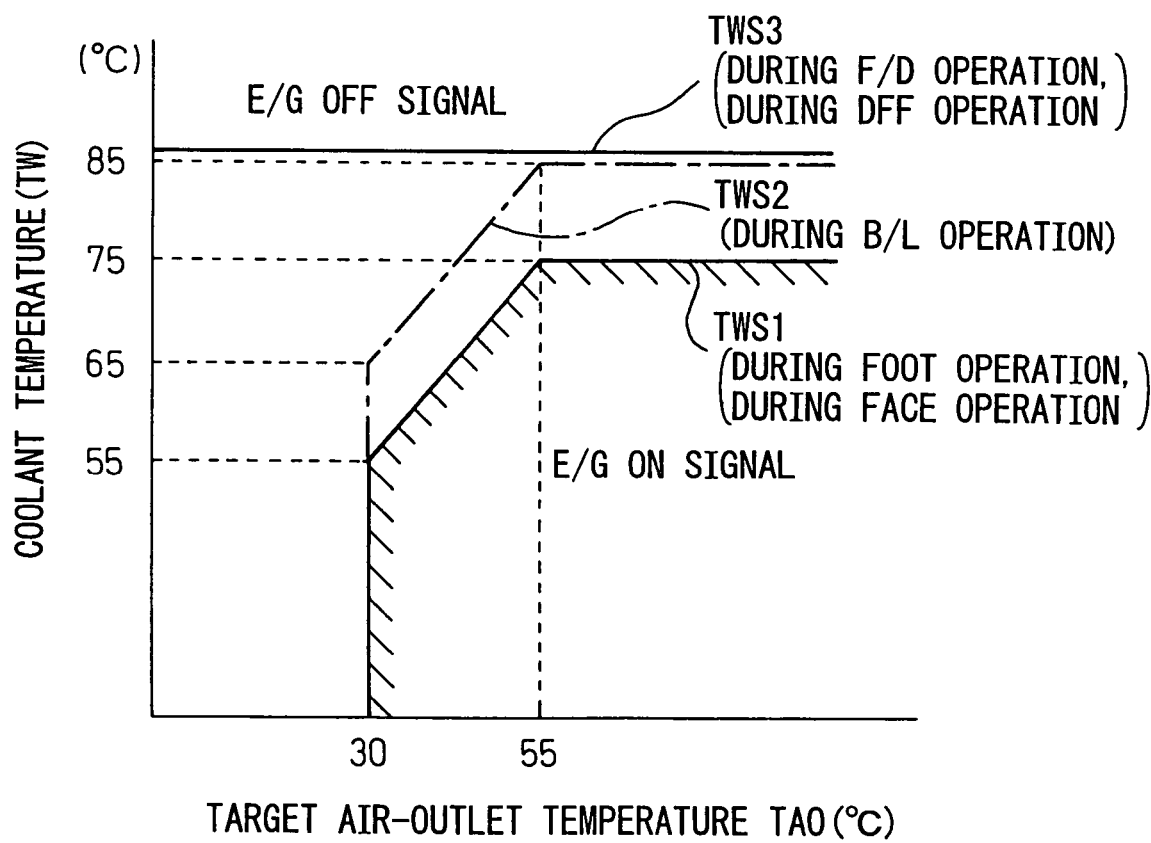
FIG. 12B is a characteristic chart of a coolant temperature control for engine operation command determination.

For example, the outlet mode is divided into three groups such as a bilevel mode, a foot mode and a face mode, and a foot/defroster mode and a defroster mode, and as shown in FIG. 12B, and the first target coolant temperature TWS1 may be used for the face and foot modes, the second target coolant temperature TWS2 for the bilevel mode, and furthermore, a third target coolant temperature TWS3 in which a high temperature area is maintained at all times (for example at 85° C. constantly) may be used for the foot/defroster mode and the defroster mode irrespective of change in TAO.

According to this construction, the defogging performance of the windscreen can be improved by maintaining the outlet air temperature at the high one at all times in the foot mode and in the face mode.

Next, to describe the relationship between the first embodiment and corresponding description requirements in the Claims of the invention, the heater core 51 corresponds to a heater in the Claims, and the vehicle running engine 1 corresponds to a heating source in the Claims. In addition, the step S4 in FIG. 5 constitutes a target outlet temperature calculation unit in the Claims, the step S6 in FIG. 5 to an outlet mode setting unit, and the step S9 in FIG. 5 (the sub-routine in FIG. 11) corresponds to a control unit for controlling the operation of the heating source.

Second Embodiment

While, in the first embodiment, the heater core 51 for heating air using the engine coolant supplied from the vehicle running engine 1 as the heat source is used as the heater for heating air sent out into the passenger compartment, a heater for heating air that is sent out into the passenger compartment is made up of a radiator on a high-pressure side of the refrigeration cycle in a second embodiment.

Figure 14:
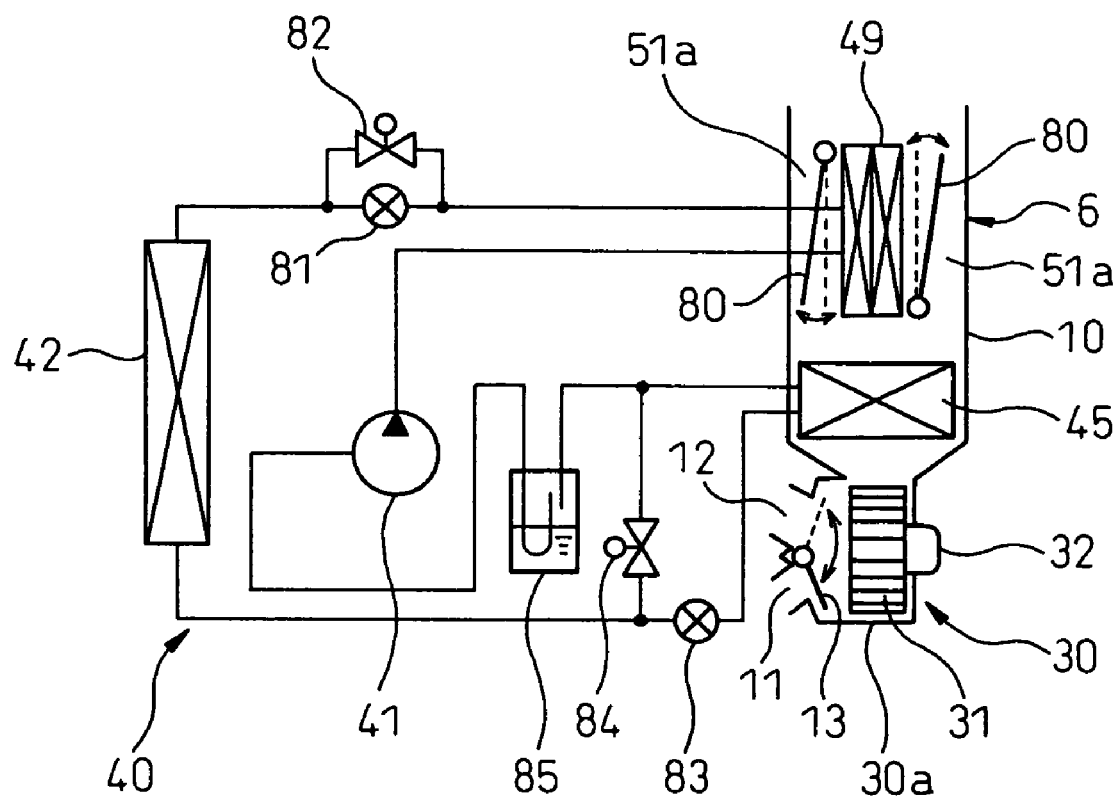
FIG. 14 is a drawing illustrating an overall construction of an electric vehicle air conditioning system according to a second embodiment of the invention.

The second embodiment will be described by reference to FIG. 14. FIG. 14 shows an air conditioning system that is applied to an electric vehicle which is provided with a vehicle running motor as a driving source for running the vehicle and with no vehicle running engine. Here, the electric vehicle may be a type such as a fuel cell vehicle in which a vehicle running motor and an on-board battery are charged with fuel cells and an electric vehicle in which an on-board battery is charged with a battery charger outside the vehicle.

In a refrigeration cycle 40, a compressor 41 is an electric compressor that is driven by an electric motor which is energized by an on-board battery. Then, a high-pressure side radiator 49 which is disposed along an air passageway within an air conditioning case 10, that is, downstream of an evaporator 45, is provided to a discharge side of the electric compressor 41.

The high-press side radiator 49 is such as to constitute a heater for heating air that has passed the evaporator 45 and is disposed at a central part of an air passageway cross section within the air conditioning case 10, whereby bypass passageways 51a are defined at left and right sides of the high-pressure side radiator 49. Two passageway switching doors 80 are rotationally disposed within the air conditioning case 10 for opening and closing the left and right bypass passageways 51a and an air passageway through the high-pressure side radiator 49.

While a downstream part of the high-pressure side radiator 49 within the air conditioning case 10 is omitted, outlets 15 to 17 and outlet switching doors 18 to 29 which are similar to those shown in FIG. 2 are provided at a downstream end part of the air conditioning case 10.

An outer heat exchanger 42 is connected to a downstream side of the high-pressure side radiator 49 along the flow of refrigerant via a parallel circuit of an electric expansion valve 81 constituting a pressure reducing or expansion unit for heating and an electromagnetic valve 82 for cooling. This outer heat exchanger 42 is such as to correspond to the condenser 42 in FIG. 2 and an outlet side thereof is connected an inlet side of the evaporator 45 via an electric expansion valve 83 constituting a pressure reducing or expansion unit for cooling.

An electromagnetic valve 84 for heating is connected in parallel to the circuit where the electric expansion valve 83 and the evaporator 45 are connected in series. Outlest sides of the evaporator 45 and the electromagnetic valve 84 for heating are connected to an inlet side of the electric compressor 41 via an accumulator 85.

At the time of heating, in the refrigeration cycle 40, the cooling electromagnetic valve 82 and the cooling electric expansion valve 83 are closed, whereas the heating electromagnetic valve 84 is opened. On the other hand, on an air conditioning case 10 side, using the two passageway switching doors 80, the air passageway in the high-pressure side radiator 49 is fully opened, whereas the bypass passageways 51a are fully closed, whereby highly pressurized discharge gas from the electric compressor 41 releases heat to air flowing through the high-pressure side radiator 49 within the air conditioning case 10 to thereby heat the air so flowing. This heated air (hot air) is sent out into the passenger compartment to heat the same.

The high-pressure liquid refrigerant condensed by releasing its heat at the high-pressure side radiator 49 is reduced in pressure by the heating electric expansion valve 81 to become a low-pressure, gas-liquid two-phase refrigerant, and the low-pressure, gas-liquid two-phase refrigerant so formed is evaporated by picking up heat from outside air at the outer heat exchanger 42. A low-pressure gas refrigerant, after evaporation, passes through the heating electromagnetic valve 84 and is then taken into the electric compressor 41 via the accumulator 85.

In addition, when setting a dehydrating mode, in the aforesaid heating state, the heating electromagnetic valve 84 is closed, whereas the cooling electric expansion valve 84 is opened whereby, as the low-pressure refrigerant is allowed to be circulated to the evaporator 45, a cooling and dehydrating operation of air can be exhibited within the evaporator 45. Consequently, by using, in parallel, the cooling and dehydrating operation at the evaporator 45 and the heating operation at the high-pressure side radiator 49, a dehydrating function can be exhibited.

At the time of cooling, in the refrigeration cycle 40, the heating electromagnetic valve 82 and the cooling electric expansion valve 83 are opened, whereas the heating electric expansion valve 81 and the heating electromagnetic valve 84 are closed. On the other hand, on the air conditioning case 10 side, using the two passageway switching doors 80, the air passageway through the high-pressure side radiator 49 is fully closed, whereas the bypass passageways 51a are fully opened, whereby there exists no heat exchange between the high-pressure side radiator 49 and the air flowing within the air conditioning case 10, and the radiator functions only as a simple high-pressure refrigerant passageway.

Then, the outer heat exchanger 42 serves as the high-pressure side radiator for performing a heat exchange with the high-pressure refrigerant, and the high-pressure liquid refrigerant that has passed through the outer heat exchanger 42 is reduced in pressure by the cooling electric expansion valve 83 to constitute a low-pressure gas-liquid two-phase refrigerant, which then evaporates by picking up heat from the air flowing within the air conditioning case 10 at the evaporator 45. The gas refrigerant after evaporation is taken into the electric compressor 41 via the accumulator 85.

Thus, as can be understood from the description, according to the second embodiment, the high-pressure side radiator 49 serves as a heater for heating air that is sent out into the passenger compartment. Then, as the heating capacity of the high-pressure side radiator 49 can be changed by the discharge capacity of the electric compressor 41 (the rotational speed of the compressor), in the second embodiment, similar function and advantage to those provided in the first embodiment can be exhibited by controlling the discharge capacity of the electric compressor 41 (the rotational speed of the compressor) such that the heating capacity of the high-pressure side radiator 49 for the target air-outlet temperature TAO during the bilevel mode operation becomes larger by a predetermined amount than the heating capacity of the high-pressure side radiator 49 during the other modes operation than the bilevel mode.

Note that, in the refrigerant cycle 40 according to the second embodiment, when using, for example, carbon dioxide ($CO_2$) as the refrigerant, the $CO_2$ refrigerant is put in a critical state due to its physical properties. Consequently, the $CO_2$ refrigerant is not condensed at the high-pressure side radiator 49 or the outer heat exchanger 42 and releases heat while remaining in the critical state. It goes without saying that the first and second embodiment can, of course, be applied to the refrigeration cycle 40 using the $CO_2$ refrigerant.

Third Embodiment

Figure 15:
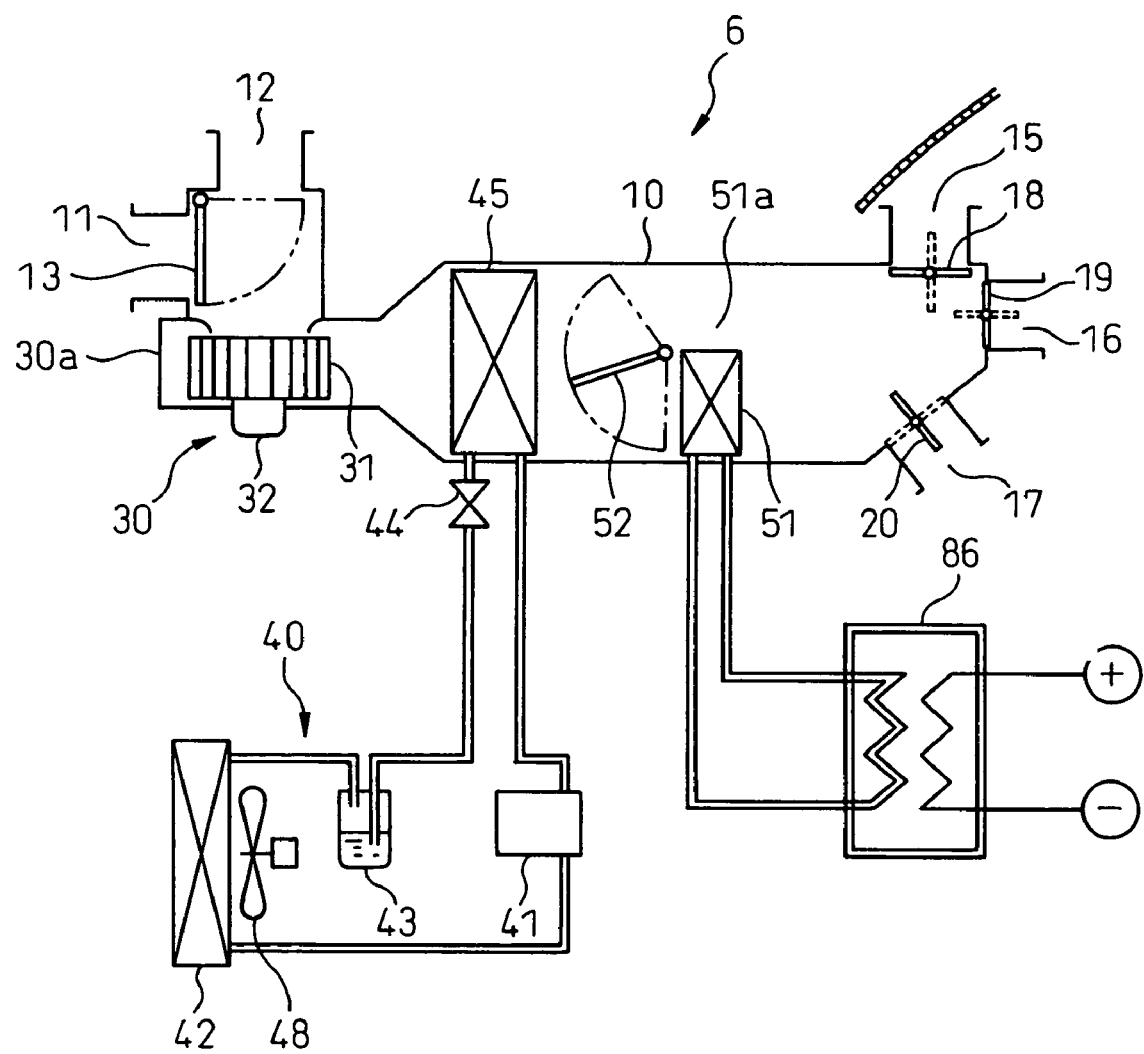
FIG. 15 is a drawing illustrating an overall construction of an electric vehicle air conditioning system according to a third embodiment of the invention.

While, in the first embodiment, the engine coolant that is heated by the vehicle running engine 1 is used as hot water that circulates to the heater core 51 for heating air that is sent out into the passenger compartment, in a third embodiment, as shown in FIG. 15, hot water that is circulated to a heater core 51 is designed to be heated by an electric heater 86.

As with the second embodiment, the third embodiment is also directed to an electric vehicle which is provided with no vehicle running engine. Consequently, a compressor 41 in a refrigeration cycle 40 is an electric compressor that is driven by an electric motor energized by an on-board battery. The remaining features of the third embodiment are identical to those of the first embodiment.

In the third embodiment, by adjusting the heating capacity of the electric heater 86, the temperature of hot water that is circulated to a heater core 51 can be adjusted. Consequently, also in the third embodiment, similar function and advantage to those provided in the first embodiment can be exhibited by controlling the heating capacity of the electric heater 86 such that the hot water temperature for a target air-outlet temperature TAO during a bilevel mode operation becomes higher by a predetermined temperature than the hot water temperature for the other modes operation than the bilevel mode.

Fourth Embodiment

Figure 16:
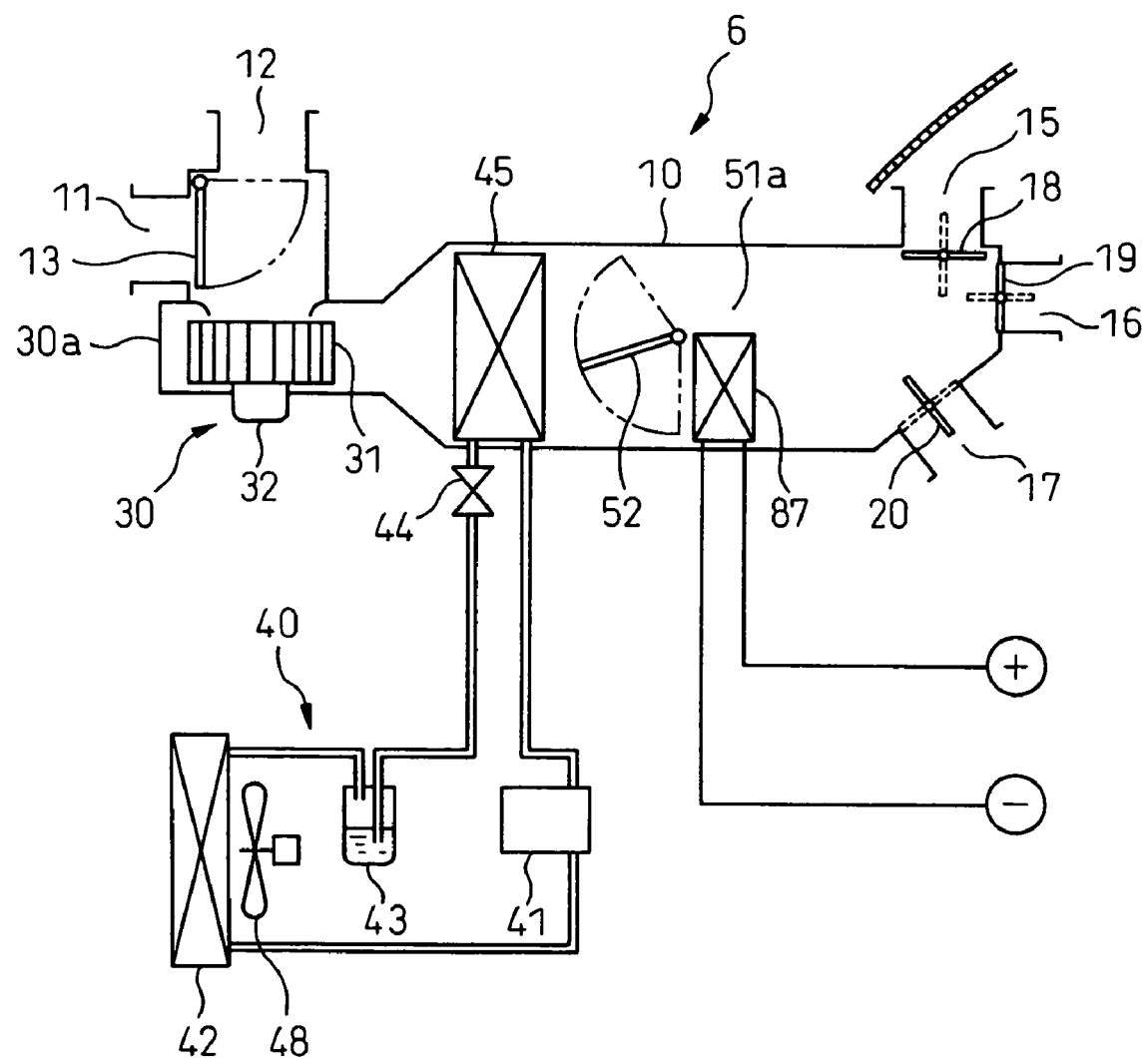
FIG. 16 is a drawing illustrating an overall construction of an electric vehicle air conditioning system according to a fourth embodiment of the invention.

While, in the third embodiment, hot water that is circulated to the heater core 51 is designed to be heated by the electric heater 86, in a fourth embodiment, as shown in FIG. 16, instead of the hot water heater core 51, an electric heater 87 is disposed directly along an air passageway within an air conditioning case 10. Here, the electric heater 87 is constructed as a heat exchanger having a laminated structure made up of a number of plate-like electric heater members and corrugated fins.

In the fourth embodiment, by adjusting the heating capacity of the electric heater 87, the capacity of heating air within the air conditioning case 10 can be adjusted. Consequently, also in the fourth embodiment, a function and an advantage similar to those provided in the first and third embodiments can be exhibited by controlling the heating capacity of the electric heater 87 such that the hot water temperature for a target air-outlet temperature TAO during a bilevel mode operation becomes higher by a predetermined temperature than the hot water temperature for the other modes operation than the bilevel mode.

Other Embodiments (1) Note that by using a combustion heater using liquid fuel such as light oil in replacement of the electric heaters 86, 87 in the second and third embodiments, and by changing the heating capacity of the combustion heater between the bilevel mode and the other outlet modes than the bilevel mode, a function and an advantage similar to those provided in the respective embodiments may be exhibited.

(2) While, in the first embodiment, the case is described in which during the foot mode operation the defroster outlet 15 and the face outlet 16 are closed, whereas only the foot outlet 17 is opened, so that air is sent out only toward the feet of the occupants in the passenger compartment, during the foot mode operation the defroster outlet 15 is slightly opened through the defroster door 18 with the foot outlet 17 being opened, so that a small amount of air may be designed to be sent out from the defroster outlet 15 toward the windscreen at the same time that air is sent out toward the feet of the occupants in the passenger compartment.

(3) While, in the first embodiment, the automotive air conditioning system is described which is applied to the hybrid vehicle in which the engine 1 and the motor 2 are installed as the driving source for running the vehicle, in recent years, with a view to protecting the environment and improving the fuel economy of engines, there is an increasing tendency that so-called energy-saving vehicles or economically running vehicles are adopted for use in which the vehicle running engine is temporarily stopped while waiting at a signal and the vehicle running engine is automatically re-started when the driver operates the vehicle to start from rest. The control of the capacity of the heater according to the invention may be applied to air conditioning systems of those economically running vehicles.

Namely, the control methods of the invention may be applied to the control of engine operation demand determination for controlling the capacity of the heater when the vehicle running engine is automatically stopped in association with the stopping of the vehicle at a signal.

(4) While, in the first embodiment, in step S4 in FIG. 5, the target air-outlet temperature TAO is designed to be calculated based on the set temperature Tset, the inside air temperature TR, the outside air temperature TAM and the sunlight amount TS, this is only one of representative examples of target air-outlet temperature TAO calculation, and for example, the target air-outlet temperature TAO may be calculated based only on the set temperature Tset and the inside air temperature TR, or the target air-outlet temperature TAO may be calculated based on the set temperature Tset, the inside air temperature TR and the outside air temperature TAM.

(5) Alternately, when the outlet mode is determined as the foot mode in step S27 shown in FIG. 11, the air mix door 52 may be controlled to be located at the maximum heating position where the whole of cold air from the evaporator 45 is caused to flow to the heater core 51 by fully closing the bypass passageway 51a while fully opening the air passageway through the heater core 51, whereas when the outlet mode is determined as the bilevel mode in step S27, the air mix door 52 may be controlled to be located at the intermediate opening position (the temperature control position) where part of cold air from the evaporator 45 is caused to flow to the air passageway through the heater core 51 with the rest of the cold air being caused to flow along the bypass passageway 51a.

While the invention has been described by reference to the specific embodiments chosen for purposes of illustration, it should be apparent that numerous modifications could be made thereto by those skilled in the art without departing from the basic concept and scope of the invention.

The invention claimed is:

1. An automotive air conditioning system comprising:
a heater for heating air sent out into a passenger compartment;
a face outlet provided on a downstream side of the heater as viewed along the flow of air for sending out air toward faces of occupants in the passenger compartment;
a foot outlet provided on the downstream side of the heater as viewed along the flow of air for sending out air toward feet of the occupants in the passenger compartment;
a target air-outlet temperature (TAO) calculating unit for calculating a target air-outlet temperature (TAO) for air sent out into the passenger compartment;
an outlet mode setting unit for setting at least a bilevel mode in which the face outlet and the foot outlet are opened at the same time and a foot mode in which the face outlet is closed, whereas the foot outlet is opened;
a heating source for heating a heating medium supplied to the heater; and
a control unit configured to control operation of the heating source such that the heating capacity of the heater for the target air-outlet temperature (TAO) during an operation in the bilevel mode becomes larger than the heating capacity of the heater for the target air-outlet temperature (TAO) during operation in the foot mode.

2. An automotive air conditioning system as set forth in claim 1, wherein the heating source is a vehicle running engine, wherein
the heater is a hot-water heater core to which a coolant is supplied from the vehicle running engine as a heating medium, and wherein
the control unit controls the operation of the vehicle running engine such that the temperature of the coolant for the target air-outlet temperature (TAO) during the bilevel mode operation becomes higher than the temperature of the coolant during the foot mode operation.

3. An automotive air conditioning system as set forth in claim 1, wherein the heater is a high-pressure side radiator into which a high-pressure refrigerant discharged from a compressor of a refrigeration cycle flows as the heating medium, wherein
the heating source is the compressor, and wherein
the control unit controls the operation of the compressor such that the heating capacity of the high-pressure side radiator for the target air-outlet temperature (TAO) during the bilevel mode operation becomes larger than the heating capacity of the high-pressure side radiator for the target air-outlet temperature (TAO) during the foot mode operation.

4. An automotive air conditioning system as set forth in claim 1, wherein the heating source is a heating source for heating provided separately from the vehicle running power source, wherein
the heater is a hot-water heater core to which hot water heated by the heating source for heating is supplied as the heating medium, and wherein
the control unit controls the operation of the heating source for heating such that the temperature of the hot water for the target air-outlet temperature (TAO) during the bilevel mode operation becomes higher than the temperature of the hot water for the target air-outlet temperature (TAO) during the foot mode operation.

5. An automotive air conditioning system as set forth in claim 4, wherein the heating source for heating can be made up of an electric heater.

6. An automotive air conditioning system as set forth in claim 1, wherein the control unit controls such that an air mix door is located at a maximum heating position when the outlet mode for the target air-outlet temperature (TAO) is in the foot mode and controls such that the air mix door is located at an intermediate open position when the outlet mode for the target air-outlet temperature (TAO) is in the bilevel mode.

7. An automotive air conditioning system comprising:
a heater for heating air sent out into a passenger compartment;
a face outlet provided on a downstream side of the heater as viewed along the flow of air for sending out air toward faces of occupants in the passenger compartment;
a foot outlet provided on the downstream side of the heater as viewed along the flow of air for sending out air toward feet of the occupants in the passenger compartment;
a target air-outlet temperature (TAO) calculating unit for calculating a target air-outlet temperature (TAO) for air sent out into the passenger compartment; and
an outlet mode setting unit for setting at least a bilevel mode in which the face outlet and the foot outlet are opened at the same time and a foot mode in which the face outlet is closed, whereas the foot outlet is opened;
the heater being adapted to adjust the heating capacity thereof directly on their own, and comprising further;
a control unit configured to control operation of the heater such that the heating capacity of the heater for the target air-outlet temperature (TAO) during the bilevel mode operation becomes larger than the heating capacity of the heater for the target air-outlet temperature (TAO) during the foot mode operation.

8. An automotive air conditioning system as set forth in claim 7, wherein the heater is an electric heater.

* * * * *